US005452869A

United States Patent [19]
Basuthakur et al.

[11] Patent Number: 5,452,869
[45] Date of Patent: Sep. 26, 1995

[54] ON-BOARD THREE-AXES ATTITUDE DETERMINATION AND CONTROL SYSTEM

[75] Inventors: Sibnath Basuthakur, Rancho Palos Verde; Loren I. Slafer, Los Angeles, both of Calif.

[73] Assignee: Hughes Aircraft Company, Los Angeles, Calif.

[21] Appl. No.: 993,948

[22] Filed: Dec. 18, 1992

[51] Int. Cl.$^6$ .............................. B64G 1/26; B64G 1/28; B64G 1/40

[52] U.S. Cl. ........................... 244/164; 244/165; 244/171; 244/176; 364/434

[58] Field of Search ........................... 364/434; 244/164, 244/165, 170, 176, 171

[56] References Cited

U.S. PATENT DOCUMENTS

| | | |
|---|---|---|
| 3,511,452 | 2/1967 | Smith et al. . |
| 3,866,025 | 2/1975 | Cavanagh . |
| 4,294,420 | 10/1981 | Broquet . |
| 4,837,699 | 6/1989 | Smay et al. ............................ 364/434 |
| 4,848,706 | 7/1989 | Garg et al. .............................. 244/169 |
| 4,961,551 | 10/1990 | Rosen ..................................... 244/164 |
| 5,020,744 | 6/1991 | Schwarzschild . |
| 5,035,381 | 7/1991 | Matthews ............................... 244/164 |
| 5,042,752 | 8/1991 | Surauer et al. ......................... 244/164 |
| 5,054,719 | 10/1991 | Maute . |
| 5,058,835 | 10/1991 | Goodzeit et al. . |
| 5,108,050 | 4/1992 | Maute .................................... 244/164 |
| 5,109,346 | 4/1992 | Wertz ..................................... 364/434 |
| 5,130,931 | 7/1992 | Paulszek et al. . |
| 5,140,525 | 8/1992 | Shankar et al. ........................ 244/171 |
| 5,172,876 | 12/1992 | Rahn ...................................... 244/169 |
| 5,205,518 | 4/1993 | Stetson, Jr. . |

FOREIGN PATENT DOCUMENTS 0460935 11/1991 European Pat. Off. ............... 244/171

Primary Examiner—Andres Kashnikow
Assistant Examiner—Virna Lissi Mojica
Attorney, Agent, or Firm—Terje Gudmestad; W. K. Denson-Low

[57] ABSTRACT

A method and system (12) for controlling the attitude of a spacecraft during its transfer orbit using an on-board, stand-alone, three-axes attitude determination and control system. The system utilizes a set of on-board sensors to define two independent angular measurements, which will initially identify the z-axis orientation of the spacecraft from an arbitrary attitude after launch vehicle separation. A set of three-axis gyros are then bias calibrated in order to measure the transverse rates of the spacecraft. The three-axis attitude of the spacecraft is continously determined by integrating the gyro outputs even if the Earth or Sun is not visible by an on-board sensor. A state estimator model is provided to determine the three-axis attitude of the spacecraft in the presence of large wobble and nutation. The system also utilizes a linear combination of the estimated attitude, rate and acceleration states to generate commanded rate increments with a pulse-width frequency modulator. The pulse-width frequency modulator seeks to linearize the inherently non-linear thruster duty cycle.

14 Claims, 22 Drawing Sheets

Fig. 1b
ACTIVE CONFIGURATION

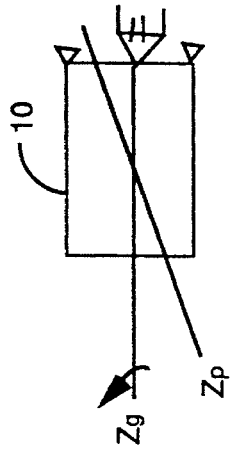

- SPIN STABILITY IS ALWASY ASSURED
- WOBBLE IS CONTROLLED EVEN WITH UNFAVORABLE MASS PROPERTIES (PERMITS ELIMINATION OF BALANCE WEIGHTS)
- GAS INGESTION ISSUE AT LOW FRACTION FILL DOES NOT EXIST

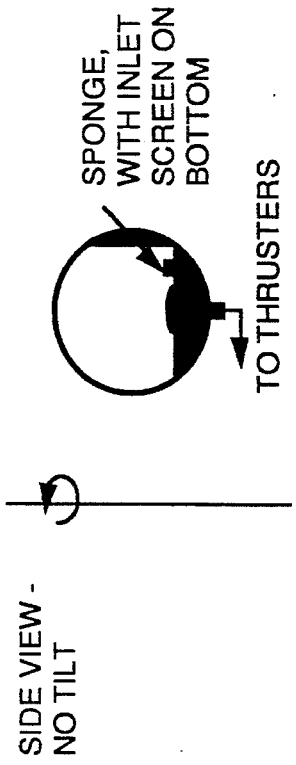

SIDE VIEW - NO TILT

Fig. 1a
PASSIVE CONFIGURATION

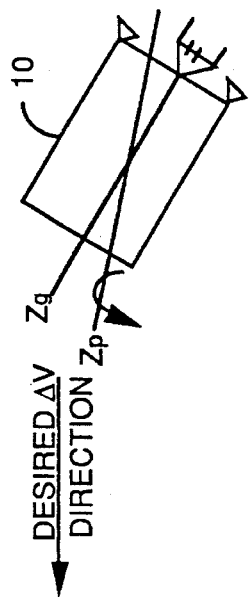

- SPIN INSTABILITY ($\sigma < 1.06$)
- UNFAVORABLE MASS PROPERTIES LEAD TO LARGE WOBBLE ANGLE
- LOW FRACTION FILL COUPLED WITH LARGE WOBBLE MAY CAUSE GAS INGESTION

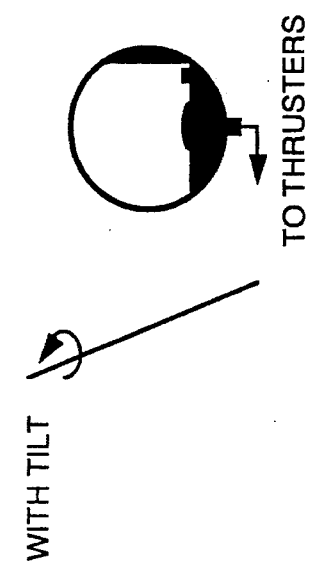

WITH TILT (FIRST POINT OF ARIES ORIGINAL MOMENTUM VECTOR IN ECI)

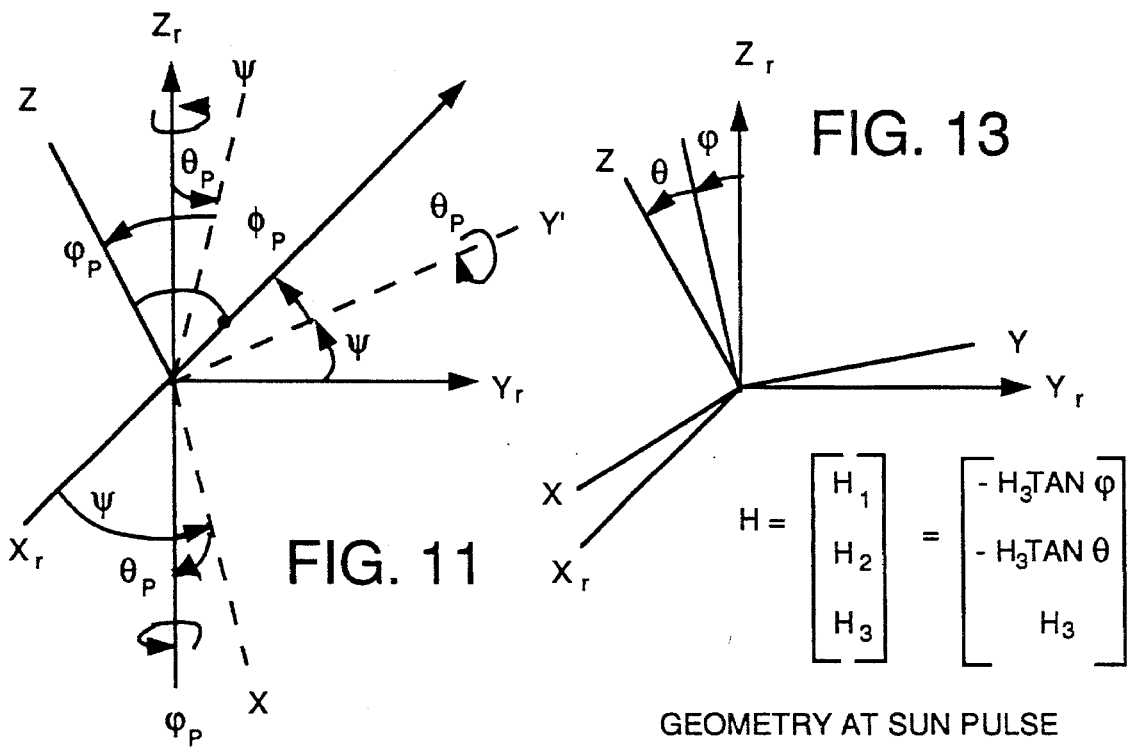
FIG. 11
FIG. 13
$$H = \begin{bmatrix} H_1 \\ H_2 \\ H_3 \end{bmatrix} = \begin{bmatrix} -H_3 \tan \varphi \\ -H_3 \tan \theta \\ H_3 \end{bmatrix}$$
GEOMETRY AT SUN PULSE
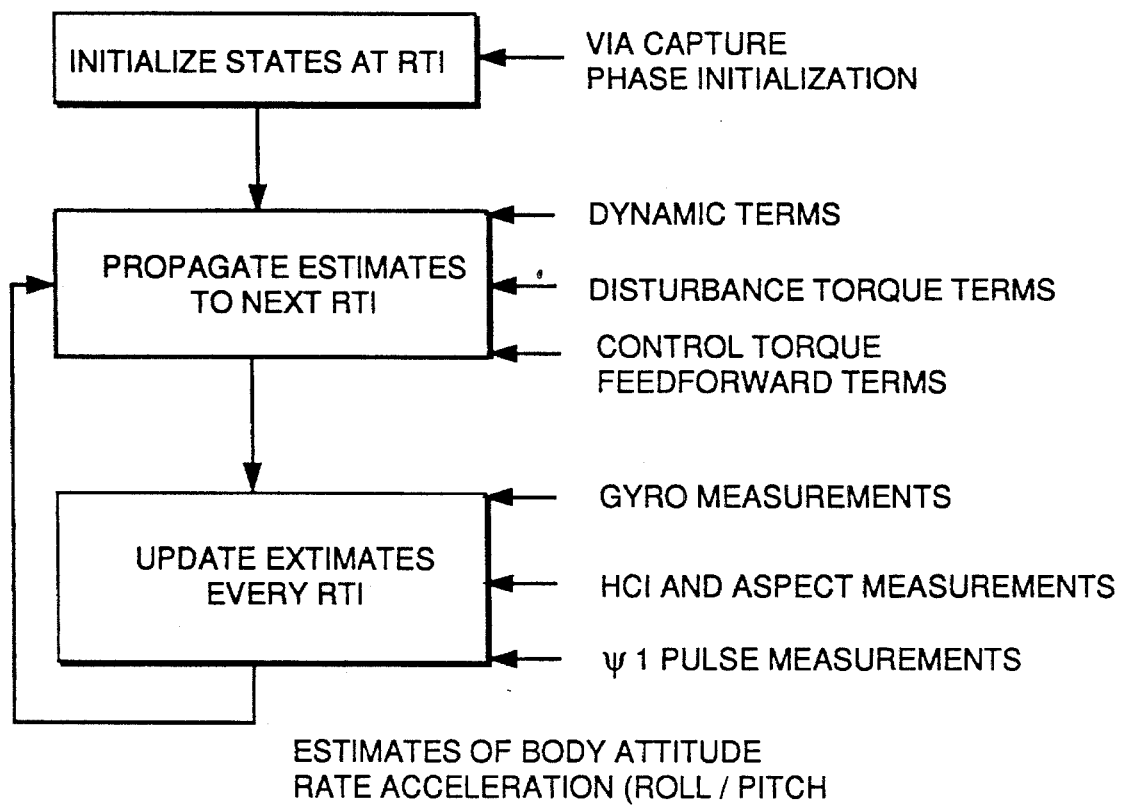
ESTIMATES OF BODY ATTITUDE
RATE ACCELERATION (ROLL / PITCH)
FIG 12

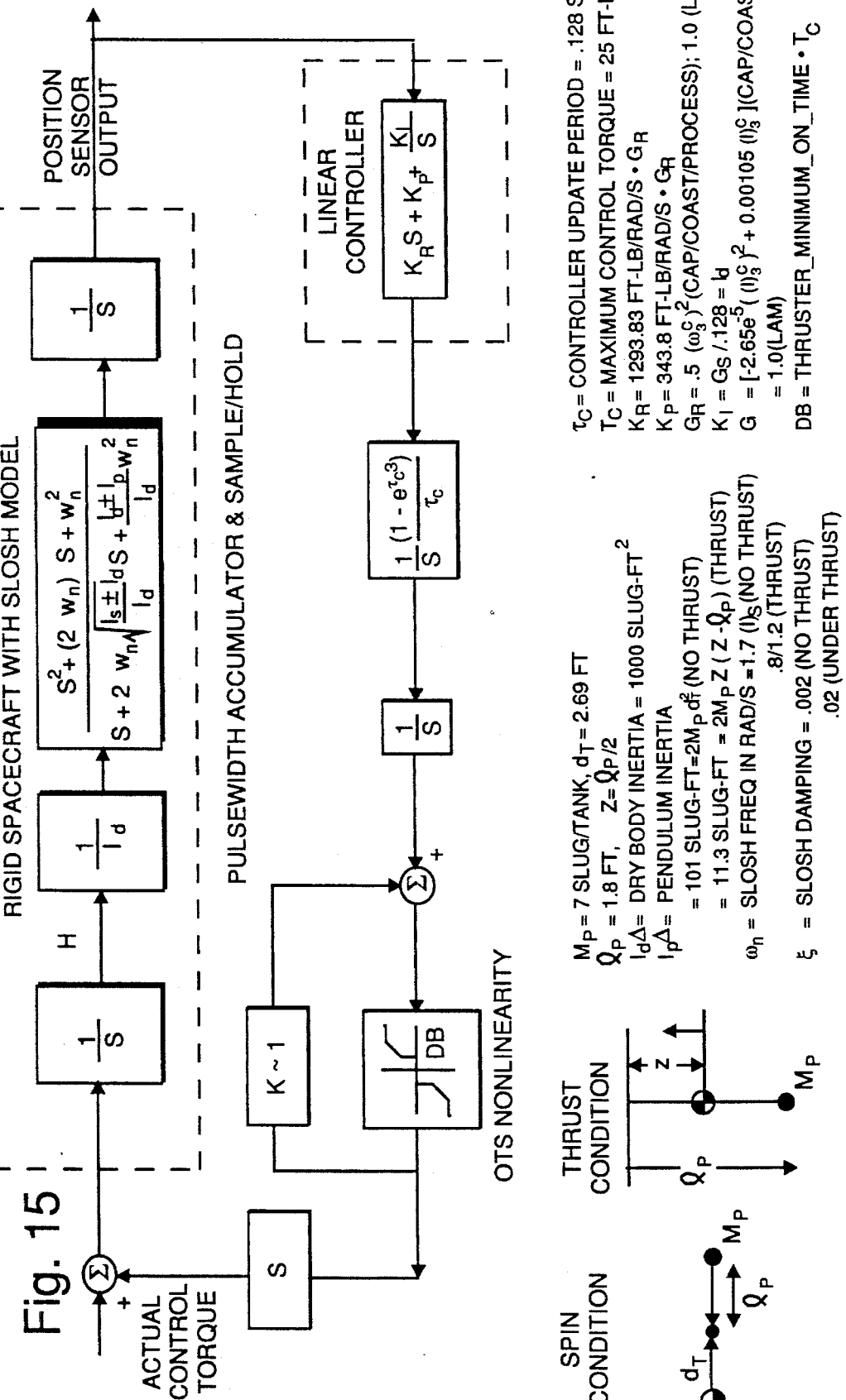
Fig. 15
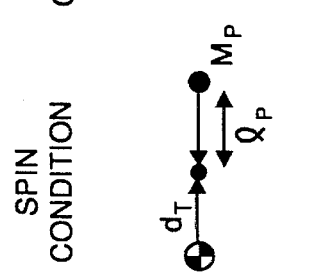

Fig. 21.

GROUND PROVIDES REQUIRED PITCH PRECESSION ANGLE $\theta_{PRECES}$, PITCH PRECESSION INCREMENT $\theta_{INCR}$, INCREMENTAL SPIN PHASE ANGLE $\psi_{TARGET}$, AND PRECESSION CYCLE DELAY TIME $T_{PRECES}$ THROUGH SAW PRECESSION COMMAND

↓

DUE TO THE FINITE SAMPLING INTERVAL $\Delta T$ (=1RTI), TARGET SPIN PHASE ANGLE ($\psi_{TARGET}$) WILL NOT IN GENERAL COINCIDE WITH ESTIMATED SPIN PHASE ($\hat{\psi}$).

↓

CHECK FOR PRECESSION TIME
$|(\hat{\psi} - \psi_{TARGET})| \le (\hat{\omega}_3 \Delta T)/DIV\_PREC$ → EXIT

↓ YES

STEERING ALGORITHMS INITIALIZES THE ESTIMATOR ATTITUDES ($\hat{\phi}, \hat{\theta}$) AT THE TIME OF PRECESSION BY THE FOLLOWING EXPRESSION (NOTE THAT THE INITIALIZATION IS PERFORMED AFTER THE ESTIMATOR PROCESSING HAS BEEN PERFORMED).

IF $|\theta_{PRECES}| <= |\theta_{INCR}|$ $\Delta\theta = |\theta_{PRECES}| \cdot sgn(\theta_{INCR}), \theta_{PRECES} = 0$ : Note: last precession $\Delta\theta = \theta_{INCR} \theta_{PRECES} = \theta_{PRECES} - |\Delta\theta| \cdot sgn(\theta_{PRECES})$ $\hat{\theta} = \hat{\theta} - \Delta\theta$ $\theta = \theta - \Delta\theta (\psi - \psi_{TARGET}) \cdot DEG\_TO\_RAD + PREC\_FOLLOW\_GAIN \cdot \Delta\theta$ Reprogrammable variable PREC_FOLLOW_GAIN (default = 0.005)

$\psi = \psi + 180 \cdot DOUBLE\_PRECESS$

WRAP $\psi_{TARGET}$ TO -180° TO 180° IF DOUBLE PRECESS=1

$\theta = -\theta \cdot (2 \cdot DOUBLE\_PRECESS - 1)$

↓

90 SECONDS AFTER THE REMAINDER OF PRECESSION COMMAND IS SENT, ASCENT_PHASE TRANSITIONS TO COAST PHASE FROM PRECESSION PHASE

↓

218

Fig. 22a.
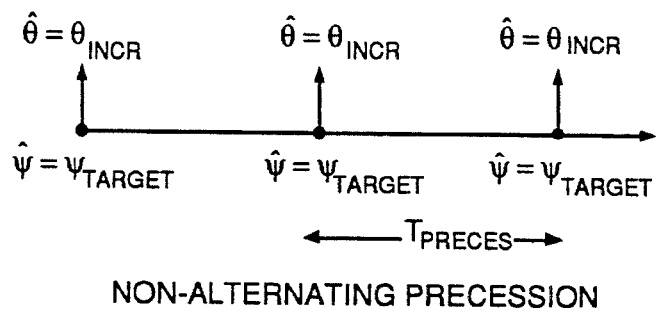
NON-ALTERNATING PRECESSION
Fig. 22b.
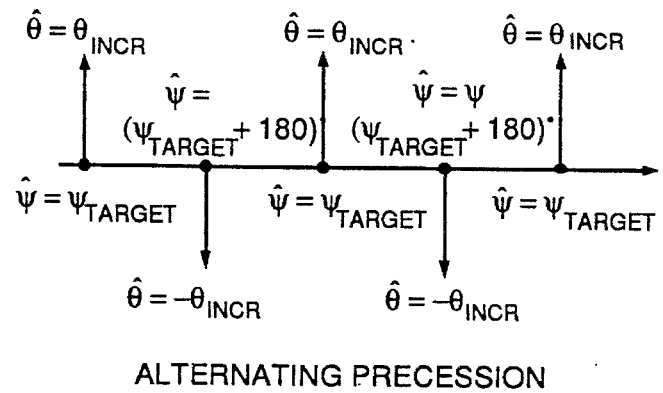
ALTERNATING PRECESSION
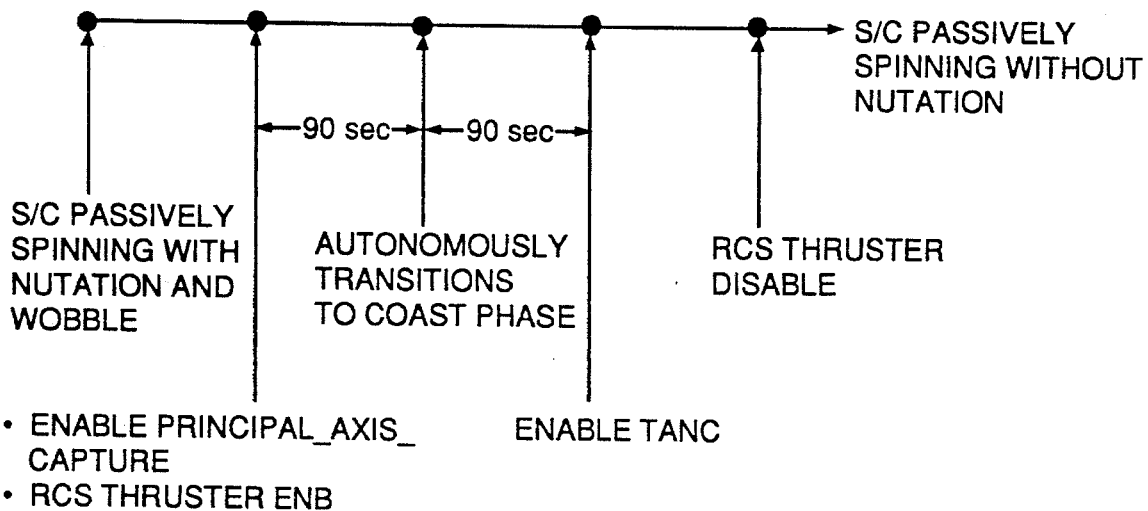
Fig. 23.

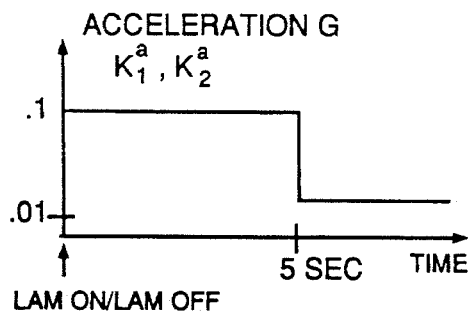
TIME-VARYING ACCELERATION
GAIN PROFILE DURING LAM
Fig. 24a.
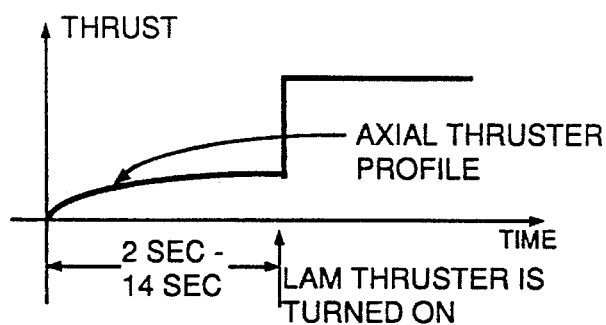
GRADUAL AXIAL THROTTLING
FOR LAM MANEUVER
Fig. 24b.
Fig. 25
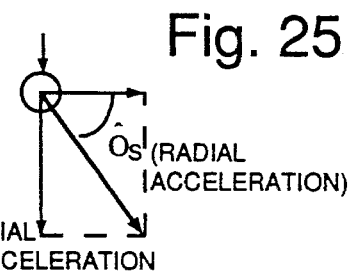
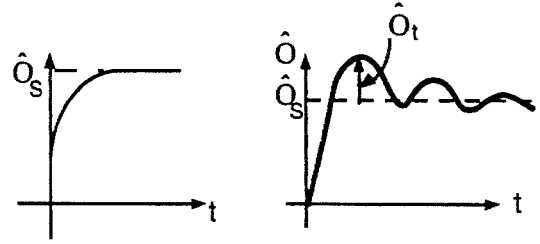
axial acceleration $= \frac{110}{3000}$ g;  $\tan \hat{o}_s = \frac{\text{axial acceleration}}{\text{radial acceleration}}$
Fig. 26
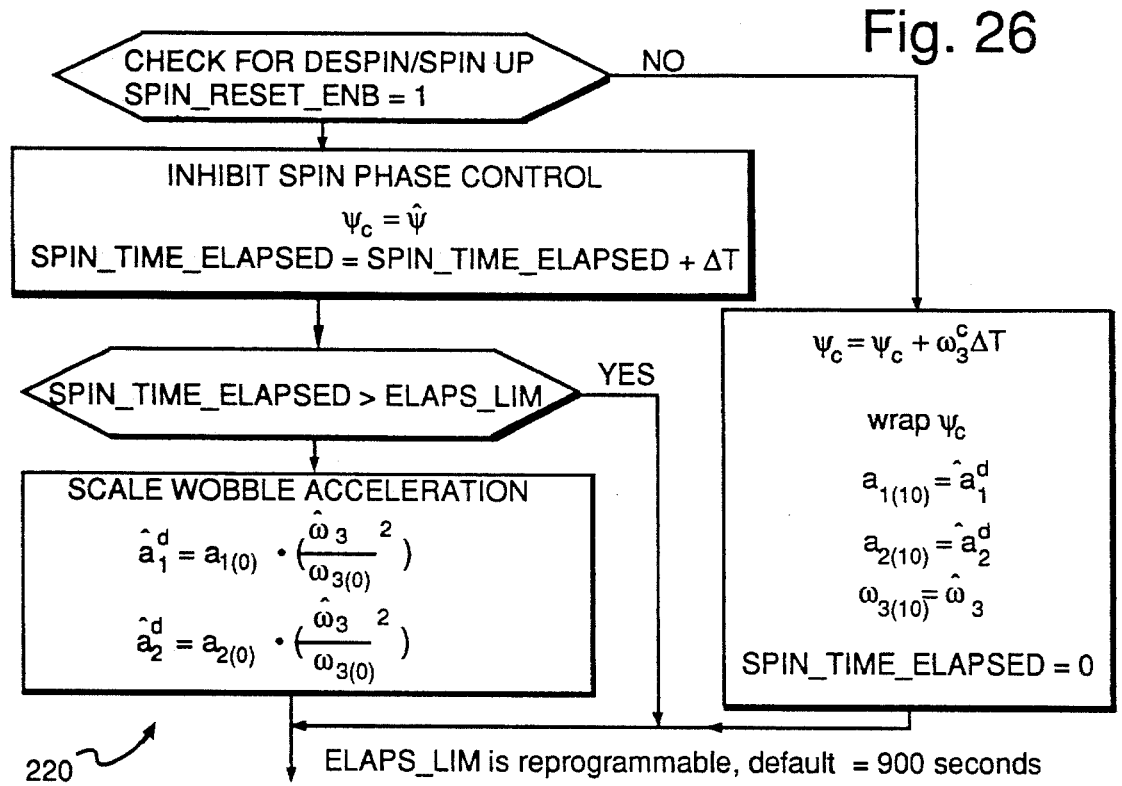
ELAPS_LIM is reprogrammable, default = 900 seconds

COMPENSATE FOR GYRO MISALIGNMENTS

$$\omega_1^m = a_{11}\omega_1^g + a_{12}\omega_2^g + a_{13}\omega_3^g$$

$$\omega_2^m = a_{21}\omega_1^g + a_{22}\omega_2^g + a_{23}\omega_3^g$$

$$\omega_3^m = a_{31}\omega_1^g + a_{32}\omega_2^g + a_{33}\omega_3^g$$

COMPENSATE FOR ESTIMATED BIAS DRIFT

$$\omega_1^m = \omega_1^m + \hat{b}_1$$

$$\omega_2^m = \omega_2^m + \hat{b}_2$$

$$\omega_3^m = \omega_3^m + \hat{b}_3$$

PERFORM GYRO BIAS CALIBRATION
(GYRO CALIBRATION GAINS ARE DEFINED IN TABLE 3)

$$\phi^g = \phi^g + \omega_1^m \cdot \Delta T \; ; \; \theta^g + \theta^g + \omega_2^m \cdot \Delta T \; ; \; \psi^g = \psi^g + \omega_3^m \cdot \Delta T$$

Wrap $\hat{\phi} - \phi^g, \hat{\theta} - \theta^g, \hat{\psi} - \psi^g$ to $\pm 180$ degrees $$\phi^g = \phi^g + (1 - \text{GYRO\_CAL} \cdot (1 - K_b^1)) \cdot (\hat{\phi} - \phi^g)$$

$$\theta^g = \theta^g + (1 - \text{GYRO\_CAL} \cdot (1 - K_b^2)) \cdot (\hat{\theta} - \theta^g)$$

$$\psi^g = \psi^g + (1 - \text{GYRO\_CAL} \cdot (1 - K_b^3)) \cdot (\hat{\psi} - \psi^g)$$

Wrap $\phi^m - \phi^g, \theta^m - \theta^g, \psi^m - \psi^g$ to $\pm 180$ degrees $$\hat{b}_1 = \hat{b}_1 + g_{11}(\phi^m - \phi^g) + g_{12}(\omega_1^g - \omega_1^m)$$

$$\hat{b}_2 = \hat{b}_2 + g_{21}(\theta^m - \theta^g) + g_{22}(\omega_2^g - \omega_2^m)$$

$$\hat{b}_3 = \hat{b}_3 + g_{31}(\psi^m - \psi^g) + g_{32}(\omega_3^g - \omega_3^m)$$

Fig. 27.

ON-BOARD THREE-AXES ATTITUDE DETERMINATION AND CONTROL SYSTEM

BACKGROUND OF THE INVENTION

1. Field of the Invention

The present invention relates generally to spacecraft attitude controllers, and particularly to an on-board system and method for autonomously controlling the attitude of a spacecraft during during all phases of a sub-transfer orbit.

2. Description of Related Art

Following the separation from a launch vehicle, a spacecraft, such as a satellite, will generally need to ascend to an altitude which will enable a geosynchronous orbit to be maintained. This period of ascent is usually referred to as the transfer or sub-transfer orbit. In order to augment the perigee and apogee altitudes of the spacecraft to such a geosynchronous level, a bi-propellant liquid apogee motor ("LAM") is typically employed to generate the necessary thrust. In this regard, it should be appreciated that the stability and attitude of the spacecraft during the transfer orbit period will have a substantial impact upon the amount of fuel which will be expended by the LAM, as well as that expended by other stabilizing thrusters.

One example of a control system which may be used during the transfer orbit phase is set forth in Rosen U.S. Pat. No. 4,961,551, entitled "Stabilization of a Spinning Spacecraft of Arbitrary Shape", which issued on Oct. 9, 1990. This commonly assigned patent is hereby incorporated by reference. The control system described therein essentially provides for two-axis control. More specifically, error signals are used to fire thruster which are duty cycle modulated to provide the equivalence of proportional control over spacecraft attitude. However, this system lacks on-board attitude determination capability and requires a relatively high spin speed for passive spin stability.

Accordingly, it is a primary objective of the present invention to provide an attitude determination and control system (and method), which has on-board three-axes control and optimizing capability during all phases of transfer orbit.

It is a more specific objective of the present invention to provide an on-board three-axes attitude determination and control system (and method) which minimizes the dry weight penalty by not requiring that the spacecraft be balanced.

It is another objective of the present invention to provide an on-board three-axes attitude determination and control system (and method) which is operable for out of view LAM and precession maneuvers when the spin rate is very low or zero.

It is an additional objective of the present invention to provide an on-board three-axes attitude determination and control system (and method) which provides accurate, active, nutation-free, precession capability to support reorientation maneuvers both before and after LAM maneuvers.

It is a further objective of the present invention to provide an on-board three-axes attitude determination and control system (and method) which performs active spin-axis precession during LAM burn to minimize cosine arc losses.

It is yet another objective of the present invention to provide an on-board three-axes attitude determination and control system (and method) which has the capability to compensate control system interaction with liquid propellant slosh motion at any fill fraction.

It is yet an additional objective of the present invention to provide an on-board three-axes attitude determination and control system (and method) which may also be used for on-board orbit prediction.

It is yet a further objective of the present invention to provide an on-board three-axes attitude determination and control system (and method) which has active monitoring of control system components and fault protection capability during active or passive transfer orbit phases.

It is still another objective of the present invention to provide an on-board three-axes attitude determination and control system (and method) which enables the elimination of configuration and mass property constraints which could otherwise require a roll-to-pitch inertia ratio of a $\sigma > 1.05$ (for passive stability).

It is still a further objective of the present invention to provide an on-board three-axes attitude determination and control system (and method) which optimizes the functioning of a propellant management device ("PMD") by eliminating gas ingestion with active wobble/nutation control at reduced or no spin speed.

It is still an additional objective of the present invention to provide an on-board three-axes attitude determination and control system (and method) which is also applicable to on-station attitude control.

SUMMARY OF THE INVENTION

In order to achieve the foregoing objectives, the present invention provides a method and system for controlling the attitude of a spacecraft, such as a satellite, during its transfer orbit using an on-board, stand-alone, three-axes attitude determination and control system. The system utilizes at least one Sun sensor and Earth horizon crossing indicator ("HCI") to define two independent angular measurements, which will initially identify the z-axis orientation of the spacecraft from an arbitrary attitude after launch vehicle separation. A set of three-axis gyros are then bias calibrated in order to measure the transverse rates of the spacecraft. The three-axis attitude of the spacecraft is then continously determined by integrating the gyro outputs even if the Earth or Sun is not visible by an on-board sensor. In this regard, a state estimator model is provided to determine the three-axis attitude of the spacecraft in the presence of large wobble and nutation. In order to provide three-axis attitude control during all phases of the transfer orbit, the system utilizes a linear combination of the estimated attitude, rate and acceleration states to generate commanded rate increments with a pulse-width frequency modulator. The pulse-width frequency modulator seeks to linearize the inherently non-linear thruster duty cycle.

One of the principal advantages of the invention is the ability to provide autonomous, three-axes stabilized ascent capability for a spacecraft which has significant mass property uncertainties and is significantly unbalanced during its transfer orbit operation. The present invention also provides a fuel efficient, fault tolerant transfer orbit control architecture. For example, a notch filter is employed to exclude sensor output frequencies representative of fuel sloshing in order to avoid thruster firings as a result of fuel slosh motion.

Additional features and advantage of the present invention will be apparent from the description of the Figures presented below.

BRIEF DESCRIPTION OF THE DRAWINGS

FIGS. 1A–1B provide two diagramatic views of a spacecraft in a passive and active configuration to assist an understanding of spin axes and wobble ("SAW") control system in accordance with the present invention.

FIG. 11 illustrates the SAW body reference orientation in the local inertial frame.

FIG. 12 illustrates the functional operation of the state estimator employed in the present invention.

FIG. 13 illustrates the initialization of the state estimator shown in FIG. 12.

FIG. 15 provides a simplified block diagram of the the nonlinear stability analysis for the selected thruster minimum on-time.

FIG. 21 is a flow diagram which illustrates the steering algorithms used for incremental precession.

FIGS. 22A–22B further illustrate that the steering algorithms shown in FIG. 21 also provide the capability to perform incremental precession in an alternating fashion.

FIG. 23 generally illustrates a fuel optimized coast operation.

FIG. 24A illustrates a time-varying acceleration gain profile during a LAM maneuver, while FIG. 24B illustrates gradual axial thrust throttling for a LAM maneuver.

FIG. 25 illustrates steady-state propellant motion under axial and radial accelerations.

FIG. 26 provides a functional logic diagram of the spin-up/despin operation employed in the present invention.

FIG. 27 provides a functional flow diagram of the gyro calibration employed during the ascent mode.

DESCRIPTION OF THE PREFERRED EMBODIMENTS

Figure 2:
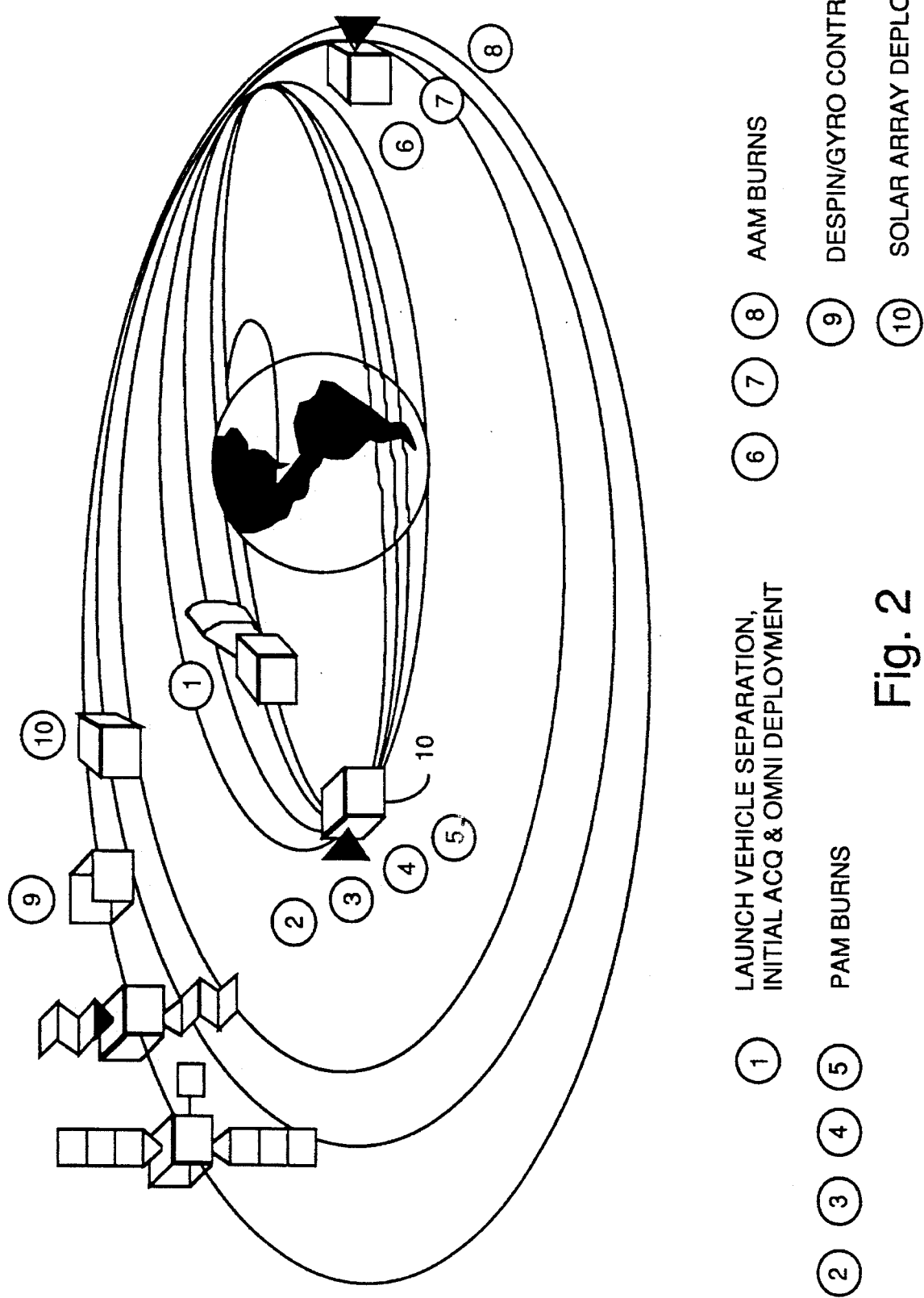
FIG. 2 generally illustrates the transfer orbit and acquisition phases for the spacecraft.

FIGS. 1A–1B show a spacecraft 10 in both a passive configuration and an active configuration to illustrate several of the factors that affect three-axis stability. While the spacecraft 10 is shown to be a generalized satellite, it should be understood that the present invention may be utilized with other suitable spacecraft in the appropriate application. In this regard, it should be noted that an Ultra High Frequency Follow-On ("UHF-F/O") satellite will used herein to illustrate the principals of the present invention. However, it should be appreciated that the principals of the present invention are not limited to a particular satellite configuration.

The objective of the Spin Axis and Wobble (SAW) control system according to the present invention is to provide a 3-axis control capability during all phases of transfer orbit. The rationale behind SAW control system, as shown in FIGS. 1A–1B, is to (i) permit the elimination of spacecraft balance weights by accommodating unsatisfactory passive transfer orbit performance with large wobble; (ii) permit mass property uncertainties and passive nutation instability (inertia ratio through unity); and (iii) avoid possible unsatisfactory PMD performance (gas ingestion) at low fraction fill and with high spin rate >5 rpm) during LAM burn.

This design topology becomes increasingly difficult due to a number of conflicting factors that are important for the control configuration definition. Some of these issues are:
(A) Challenging Design Goals:

The ability to launch on any day coupled with power constraint associated with unfavorable sun angle for the spacecraft mission dictates large angle precession requirement in relatively short time;

The need to accurately control a highly unbalanced spacecraft requires estimation of unbalance (wobble) torque along with LAM static offset torque;

The need to perform a LAM maneuver with spacecraft actively controlled at spin speed from ⅓ rpm to 4 rpm (to minimize fuel penalty associated wobble/LAM static torque) requires spin speed dependent controller gains Rapid spin/despin capability to support LAM, attitude determination and precession requirements (without generating excessive attitude error) requires rapid estimation of wobble acceleration;

Mass property uncertainties leading to a passively nutational instability should be accommodated;

Controlling propellant slosh motion with varying fill fractions requires a prudent control approach to maximize the effectiveness of the propellant management device (PMD) function especially during precession, despin and LAM operations;

Initial gyro turn-on/turn-off rate constraint of 10°/sec should be met to minimize any possible permanent damage of the inertial reference unit (IRU);

Gyro operating in high range (baseline operation for SAW) may have relaxed performance spec requirements compared to that at low rate range operation (e.g. station keeping);

Horizon crossing indicator may not function well at spin speed below 5°/sec (droop characteristics) to provide good chord data for attitude determination;
(b) Optimal Transfer orbit software architecture in terms of:
   acceptable software throughput impact;
   acceptable code size;
(c) Flexible controller architecture to address:
   changing system requirements;
   system faults, contingency/recovery and operational constraints.

Active on-board three-axis attitude determination and stabilization with Integral propulsion strategy is the method of control for the active transfer orbit phase of the spacecraft 10, with attitude sensing intelligence provided by a horizon crossing sensor and a plurality of slit sun sensors, and three-axis rate sensing with a set of three-axis gyros. As noted in transfer orbit/acquisition block diagram of FIG. 2, the SAW controller can be activated, if required, during PAM (Perigee Augmentation Maneuver) and AAM (Apogee Augmentation Maneuver) burns. Determination of spin axis attitude during the active control phase is required in order to provide reorientation commands to maneuver the spacecraft ("S/C") to the desired burn attitude. Accurate estimation of the S/C attitude is necessary to minimize the amount of energy required for subsequent orbit corrections. The active attitude determination and control described herein first implements an attitude propagation with gyro data. It then uses a (i) set of recursive filtering equations based on an extended Kalman filter formulation to linearize the non-linear aspect and (ii) chord measurement equations to estimate the attitude state vector to a high degree of accuracy. Finally, a linear thruster controller algorithm is utilized to duty-cycle axial/north thrusters to support control functions during all transfer orbit phases.

The transfer orbit attitude determination and control is realized with a baseline unified state estimator/controller structure that supports all ACS operational modes of the spacecraft 10 with operational mode-specific gains for the estimator and controller. On-board implementation of the transfer orbit-unique functions have been captured in the SAW sequencing logic. The sequencing logic sets (i) the initial conditions for the state estimator; and (ii) the invocation timing for the SAW controller.

Figures 3A, 3B:
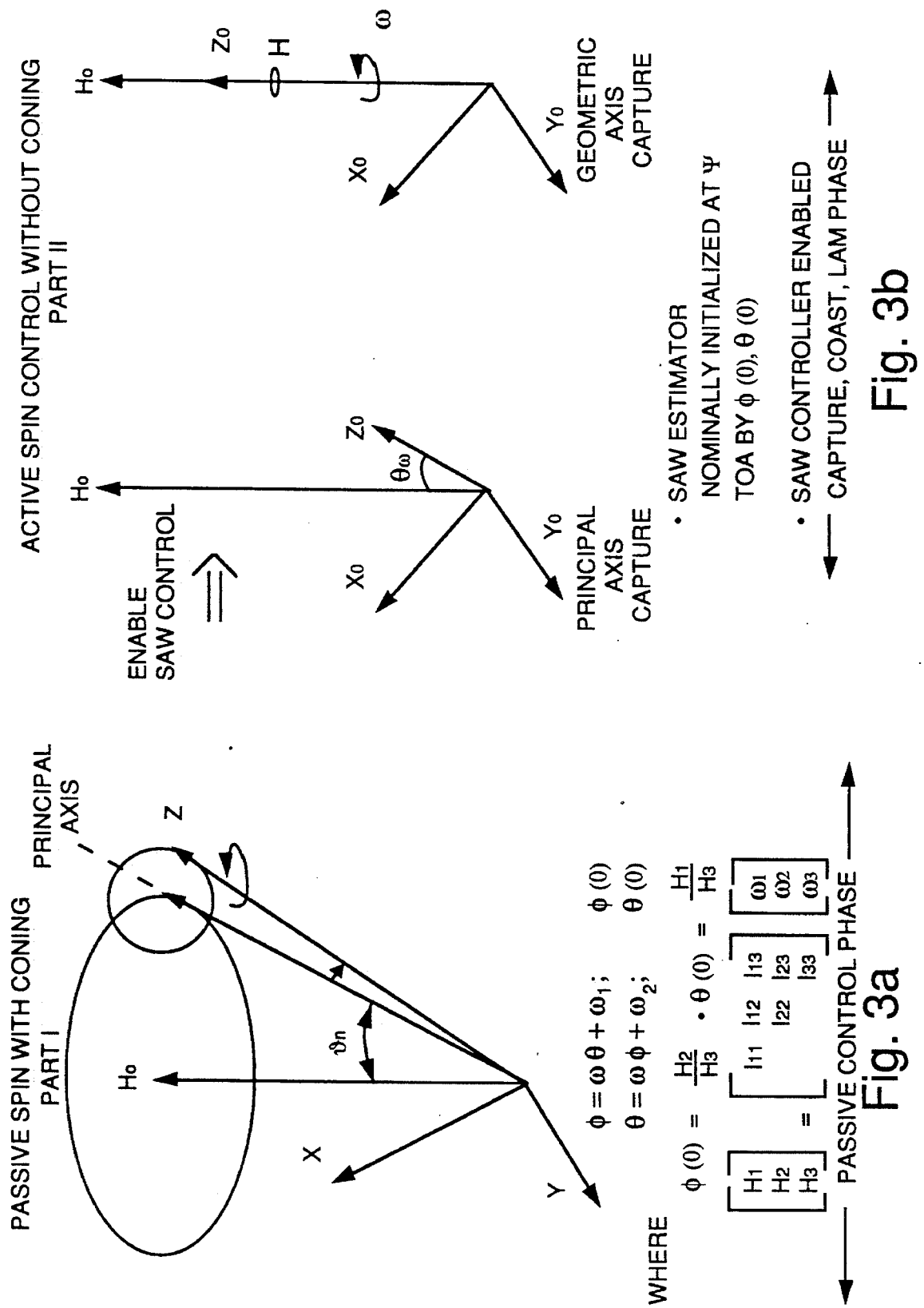
FIGS. 3A–3C depict the primary control transitions during transfer orbit operations.
Figure 3C:
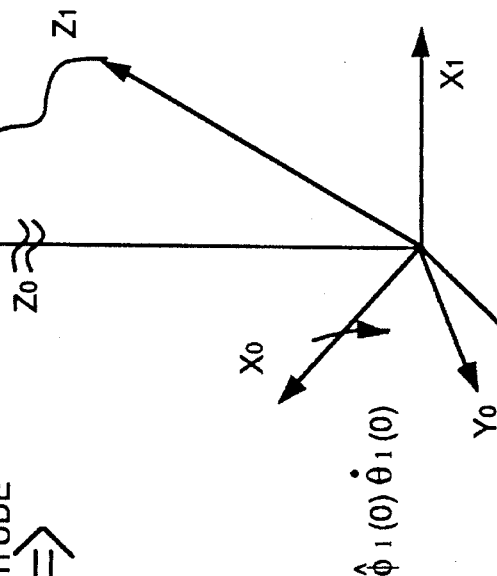

FIGS. 3A–3C depict the primary control transitions during transfer orbit operations. With a passively spinning configuration with a certain nutation $\theta_n$ and wobble angle $\theta_w$, as shown in FIG. 3A (Part I), the on-board SAW sequencing logic computes the initial condition for the state estimator such that the geometric (z) axis is precessed to the original momentum vector $H_o$ orientation when control actuation is enabled. The z-axis capture (Part II of FIG. 3B) is performed optimally when the cone angle between the momentum vector $H_o$ and the z-axis is minimum, thereby reducing fuel slosh motion and associated fuel consumption. For principal axis capture, only the nutation $\theta_n$, is removed. Part II of FIG. 3 also depicts other active transfer orbit operational phases including coast, LAM and despin/spin up phases. The geometric or principal axis orientation is controlled during these phases with reference to a target orientation (e.g. initial momentum orientation, good-sun orientation or LAM orientation). The instantaneous momentum vector H cones with a residual wobble angle (~0.02°) as shown in FIG. 3A.

The precession or reorientation phase (Part III of FIG. 3C) defines the precession of the z-axis to the desired apogee firing attitude so that the LAM thruster can provide necessary delta-V to circularize the orbit. A large precession of the z-axis, if required, should be performed on small incremental steps such that the uncertainties associated with large propellant motion can be avoided. It should be noted here that the transfer orbit ground software may be used to define the necessary precession angle and target phase angle. The target phase angle (specified in terms of the spin phase angle of the $\psi_1$ sun sensor before the start of precession. The utilization of the yaw gyro output to determine the spin phase angle during precession allows one to preserve the pre-maneuver spin phase referencing such that all incremental precessions can be performed at a fixed target angle. The precession strategy will, therefore, allow a large (70°) reorientation maneuver to be performed accurately (<0.5° precession error) without (i) creating large fuel motion and (ii) requiring excessive on-board trigonometric computations for spin phase adjustment for the sun angle changes during precession.

The precession of the z-axis is accomplished by generating two sinusoidal torques about the body roll/pitch axes with a 90° phase angle between the torque components. Since the torque components are also spatially out-of-phase by 90°, an ideal inertial precession is realized by these two torque components. The precession of the z-axis as mentioned before is performed on an incremental basis, with each incremental precession step being executed at the original target phase angle to yield a fuel and time-optimized great circle arc maneuver. Since the $\psi_1$ sun sensor phase angle is continually changing during the great circle arc (not a Rhumb line precession) maneuver, integrated gyro yaw rate output (after compensated for gyro bias), instead of $\psi_1$ sun sensor information is used to realize spin phase angle determination during precession. Roll/pitch gyro calibration capability is provided to instrument gyro based z-axis attitude referencing with respect to sun/earth line at nonzero and zero-spin speed, if required.

Also, note that on-board attitude determination at nonzero spin speed utilizes the aspect sun sensors and HCI measurements to define two independent angular measurements required to specify z-axis orientation. The sensor selection and error processing block shown in FIG. 5 computes the predicted sun sensor based aspect measurement. The SAW sequencing logic computes the predicted chord measurement so that attitude updates can be performed with HCI data. It is important to emphasize that aspect sensor measurements ($\psi_1-\psi_2$, $\psi_1-\psi_5$, $\psi_1-\psi_6$) along with $\psi_3/\psi_4$ sensor sunline error outputs provide one attitude measurement update even when the HCI data is not available. Once an attitude referencing with HCI is established, technically no further visibility of earth by HCI is required for the rest of the transfer orbit operation under SAW, provided there is no orbit perturbation and gyro data is continuously available. The gyro-based control of the orientation of the z-axis of the spinning spacecraft does not accumulate attitude error with time, due to the fact that the spacecraft is spinning (acting similar to a bias momentum spacecraft) with one sun sensor based position measurement (about inertial pitch axis) available all the time to update z-axis attitude changes.

There are specific design criteria related to six operational phases of the spin axis attitude and wobble control during transfer orbit operations. These operational phases are defined below:
   a) Passive phase occurs when ascent mode is commanded with the reaction control sub-system ("RCS") thruster disabled and no other phases are enabled. (Ascent_Phase=0)
   b) Capture phase is intended to stabilize the body z-axis from a passively stable control configuration such that the body z-axis is aligned with the initial momentum vector. (Ascent_Phase=1)

c) Attitude Reor or Precession maneuver phase is defined by the active attitude reorientation and control state to precess the spacecraft z-axis to the desired apogee motor firing (AMF) attitude. (Ascent_Phase=2)

d) LAM burns phase is defined by active three-axis control of the spacecraft body axes under LAM firing conditions. (Ascent_Phase=3)

e) Coast phase is defined by the spacecraft in an active control configuration under no thrust (i.e., no LAM on) condition. The spin axis orientation is maintained to the initial inertial orientation. (Ascent_Phase=4)

f) Spin_up_down phase is defined by active despin or spinup of yaw axis without generating any significant spin axis attitude error.

g) Principal axis capture is intended to stabilize the principal axis from a passive spinning and nutating spacecraft.

Figure 4:
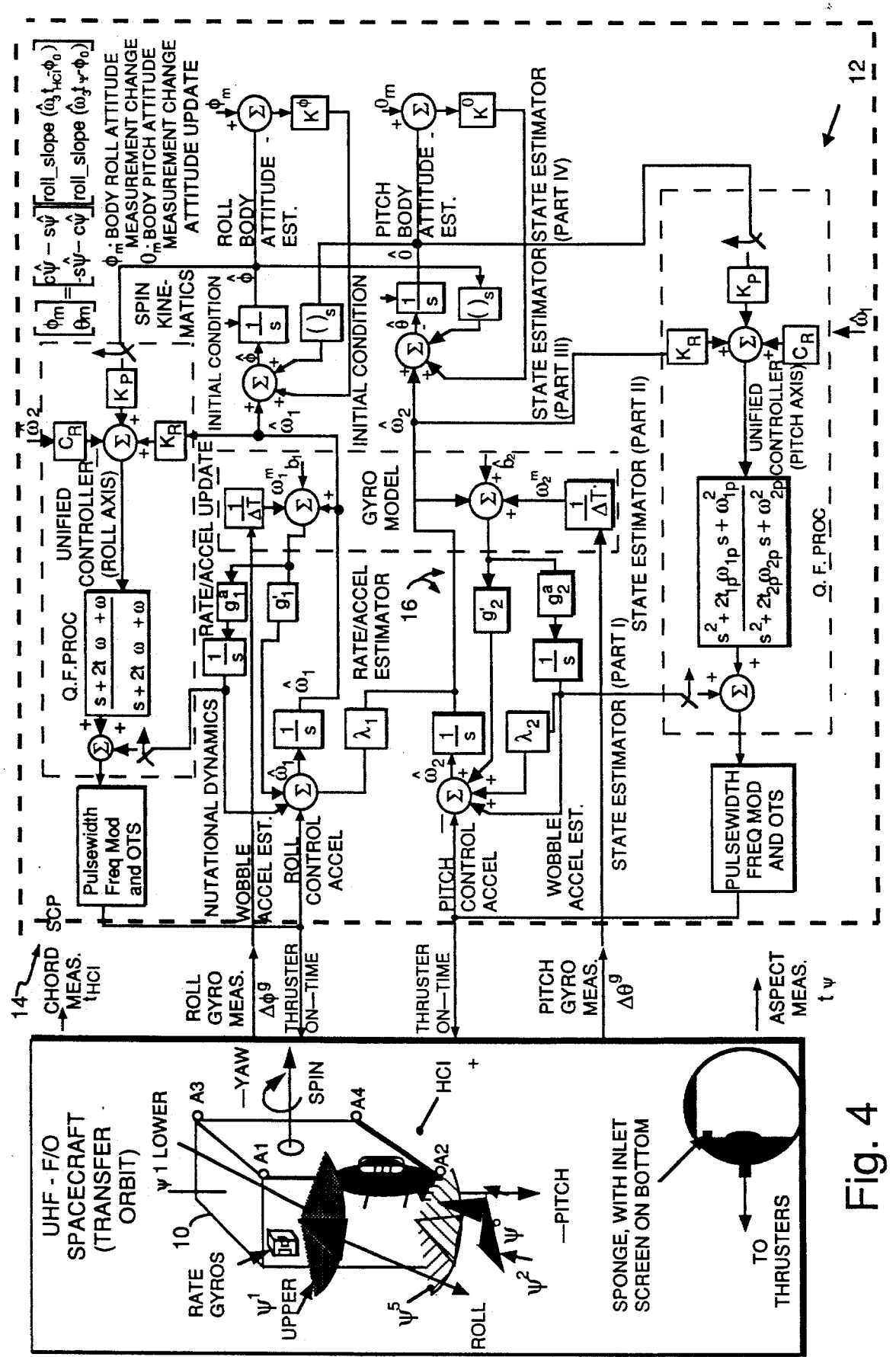
FIG. 4 is a functional block diagram of the SAW controller in accordance with the present invention.

The SAW control system according to the present invention performs the following functions:

Subsystem Areas:
 Provides on-board three-axis attitude determination capability using a state estimator model and three-axis gyro measurements to propagate three-axis attitudes, then updates yaw attitude with $\psi_1$, sun sensor, pitch attitude with aspect sensor and roll/pitch attitude with HCI measurements
 Implements spin rate (over 0–4 rpm) optimized 3-axis pointing control under all transfer orbit phases
 Capture from a passively spinning to an active control with large wobble and nutation at optimal instance with minimal attitude error and fuel slosh
 Utilizes a fuel-efficient, large angle, incremental precession strategy under active 3-axis control using an on-board steering algorithm that minimizes fuel slosh excitation
 Provides full 3-axis control during LAM (in presence of slosh/propellant mode, static and dynamic unbalances) without impacting functioning of PMD with graduated axial throttling before LAM initiation
 Allows rapid despin/spin up capability with minimum attitude error
 Provides yaw gyro bias calibration for precession maneuver, roll/pitch gyro calibration to instrument earth/sun referenced z-axis attitude at zero/nonzero spin attitude System areas:
 Insures nutational stability in presence of mass property and fraction fill uncertainties, (rigid body mass property uncertainty ≅2.5% with $0.9<\sigma_{flex}<1.2$) and fraction fill variation (37%-6%)
 Implements large angle precession requirement in short time duration to minimize power outage for an extended period
 Provides fuel optimized LAM burn with minimum coning loss As shown in FIG. 4, SAW controller 12 according to the present invention is designed to realize:

i A body-fixed control torque in a spinning spacecraft to compensate body-fixed wobble torque and/or static disturbance torque (during coast or LAM);

ii A nutation-free sinusoidally-varying control torque in the body to precess z-axis (during precession maneuver);

iii A smooth torque transition from a sinusoidally varying control torque to a fixed control torque (during geometric axis capture maneuver).

The SAW controller 12 is shown in FIG. 4 to be embodied within an on-board spacecraft control processor ("SCP") 14. The SAW controller 12 employs an on-board state estimator 16 which is shown to include four parts. The state estimator 16 is based on a nutational dynamic/spin kinematic model (state estimator Part I and Part III). The acceleration and rate estimates are then updated with gyro data (Part III). HCI/sun sensor measurements are used for attitude updates (Part IV).

The predicted sun aspect measurement $\theta_o$ and chord measurement $\phi_o$ are computed on-board, based on the desired Z-axis orientation with respect to sun and earth. The on-board earth chord and sun sensor aspect measurements are compared against predicted measurements to define the measurement changes about an operating point ($\theta_o$, $\phi_o$ defined by the desired orientation of the z-axis with respect to sun and earth). These measurement changes are then converted to equivalent attitude changes using the sensor slope data. It should also be noted that the measurements obtained by these sensors are inertial attitude measurements at different spin phase (or sun-earth separation) angles. The inertial measurement changes are adjusted to realize equivalent body measurements with a simple rotational matrix transformation. The polarity of the attitude change due to a chord change has been addressed along with the time-varying sensitivity of the attitude error to a chord change by a sign-sensitive time-varying gain.

The attitude control during transfer orbit is implemented through a linear feedback of acceleration, rate and position estimates. The acceleration estimate is generated to compensate the wobble torque and/or LAM static offset torque. The SAW controller 12 provides the capability to operate in an active phase-stabilized or gain-stabilized configuration during LAM burn. The baseline phase-stabilized configuration is realized with a high bandwidth (≅1 rad/sec) where phase lead can be provided, if required, with a notch filter. Thus, the stability of the control system is assured even when the slosh dynamic coupling changes from a zero-pole to a pole-zero configuration with varying fraction fill. For a gain-stabilized configuration, the notch filter parameters and the gain coefficient ($G_R$) can be adjusted to realize a roll-off filter configuration with a low bandwidth controller.

Figure 5:
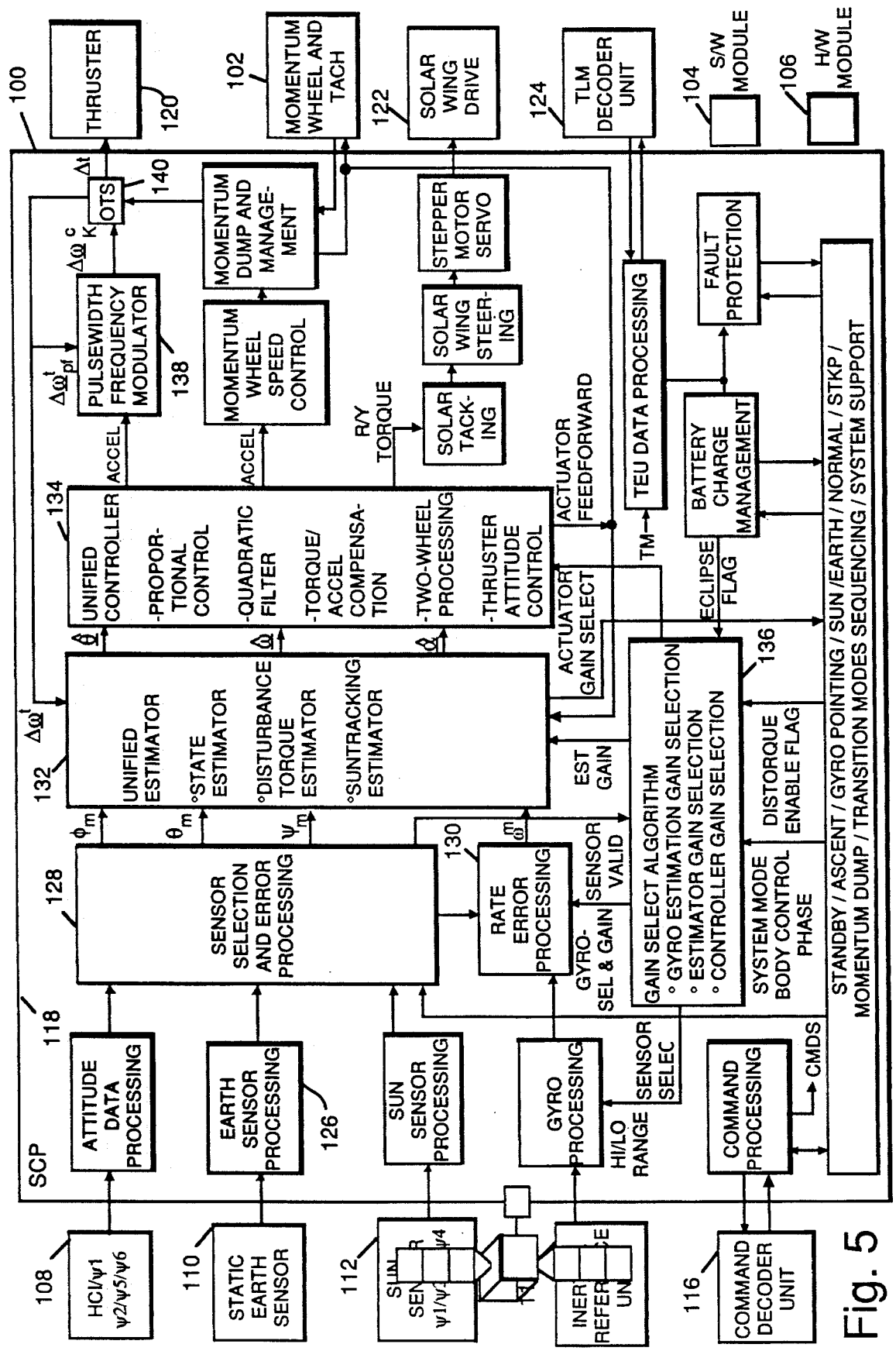
FIG. 5 is a functional block diagram of the attitude control system ("ACS") which may be employed with the SAW controller of FIG. 4.

It should be noted at this point that the realization of SAW controller may be implemented within the baseline unified estimator/controller architecture shown in FIG. 5. In this regard, FIG. 5 shows the available sensors, software functions and actuators to support all ACS modes.

FIG. 5 provides a functional block diagram of a spacecraft attitude control system ("ACS") 100 in which the present invention may be employed. This particular ACS is adapted for use in ultra high frequency ("UHF") communication satellites which are equipped with one or two momentum wheels 102. However, it should be understood that the present invention may be used in a variety of ACS designs. The legend block 104 indicates which of the components shown in the diagram are implemented in software, while the legend block 106 indicates which of these components are implemented in hardware.

At the left-hand side of FIG. 5, a series of blocks are shown to indicate the available input sensors. For example, block 108 shows that the spacecraft 10 is preferably equipped with a plurality of horizon crossing sensors. Similarly, one or more static Earth sensors 110 are used to provide an indication of the orientation of the spacecraft 10 relative to a planetary reference, such as the Earth. Block 112 shows that the spacecraft 10 is equipped with a plurality of Sun aspect sensors. Similarly, block 114 shows that the spacecraft 10 is preferably equipped with a set of three-axis gyros to provide inertial reference information. A command decoder unit 116 is also provided for bi-directional communication of command signals with a ground station.

The center section of FIG. 5 illustrates the spacecraft control processor 118 which determines which control actions should be taken in response to the input signals received from the on-board sensors and ground station commands. In this regard, the right-hand side of FIG. 5 shows the output devices which are responsive to the SCP 118. For example, the thruster block 120 preferably includes a plurality of thruster motors which may be selected for actuation. Similarly, the SCP 118 will be used to control the speed of the momentum wheels 102 and the angular position of the solar array through the solar wing drive 122. A telemetry decoder unit ("TLM") is also used to process telemetry signal, so SCP knows the state of health.

The SCP 118 is shown to include a processing circuit for each of the input signals received, such as block 126 for the static Earth sensor 110. The direct attitude sensor signals are then transmitted to a sensor selection and error processing block 128. The sensor selection and error processing block provides an Earth sensor roll signal $\phi_m$, a yaw signal $\psi_m$ and a phase angle signal $\theta_m$. Similarly, the gyro input signals are transmitted to the rate error processing block 130, which generates a rate signal $\omega^m$. These signals are then submitted to a unified state estimator 132, which estimates the state of various parameters such as the roll rate ($\omega_1$) and the yaw rate ($\omega_3$), shown generally by the rate estimate parameter $\omega$.

The estimated state parameters are transmitted to a unified controller 134, which includes the filters and algorithms which are appropriate to the control scheme. The gain constants employed in these algorithms may be modified through the gain select block 136. The gain select block 136 is responsive to commands issued from a ground station and/or the current operating mode of the spacecraft 10, such as Earth or Sun hold. In terms of thruster control, the unified controller 134 will generate one or more control acceleration values which may ultimately cause the actuation of an appropriate thruster motor. These acceleration values are submitted to a pulse-width frequency modulator 138, which will generate a signal that determines the non-linear on/off cycling time for one or more thruster motors 120. The ultimate selection of the appropriate thruster motor is determined by the optimal thruster selection logic block 140.

Figure 6:
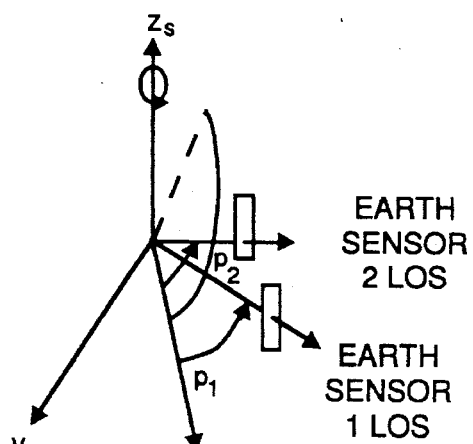
FIG. 6 illustrates the horizon crossing indicators ("HCI") or sensors on the spacecraft.
Figure 7:
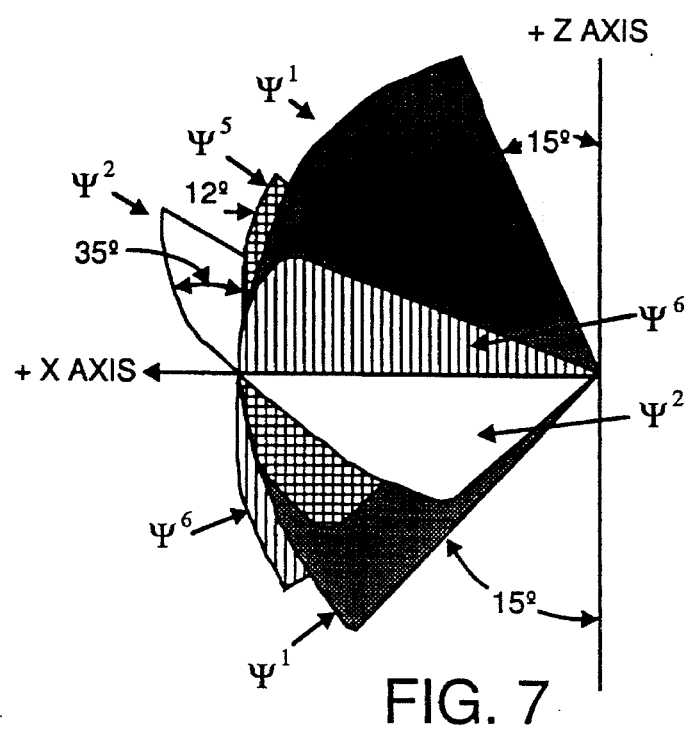
FIG. 7 illustrates the sun sensors on the spacecraft and their cant angles.

As mentioned above, spin axis attitude sensing during active transfer orbit is determined from information provided by a horizon crossing indicator, a set of sun aspect sensors and three axis rate gyros, such as those shown in FIG. 5. The information available from these sources is:

a) Time between pulses ($\Delta t_{sp}$) from the various sun aspect sensors, used to compute aspect angle between spin axis and sunline b) Time from sun pulse to leading edge of earth pulse ($t_{LE}-t_{sp}$)

c) Earth horizon chord period ($t_{TE}-t_{LE}$)

d) Times of occurrence of sun and earth intercept pulses e) Three axis body rates Consider that the horizon crossing sensors are mounted with the normals to their fields of view in the $y_B-z_B$ plane as shown in FIG. 6. The mounting angles $\rho_1$ and $\rho_2$ are given as 5° and 15° measured from the x axis. The sun sensors, $\psi_1$, $\psi_2$, $\psi_5$, and $\psi_6$ are shown in FIG. 7 with their respective cant angles. The sun sensors provide an almost $4\pi$ steridian coverage with a very small "keyhole" or blockage. The redundant inertial reference unit (IRU) is preferably comprised of two-degrees of freedom gyros providing three-axis rate information about spacecraft body axes.

Figure 8:
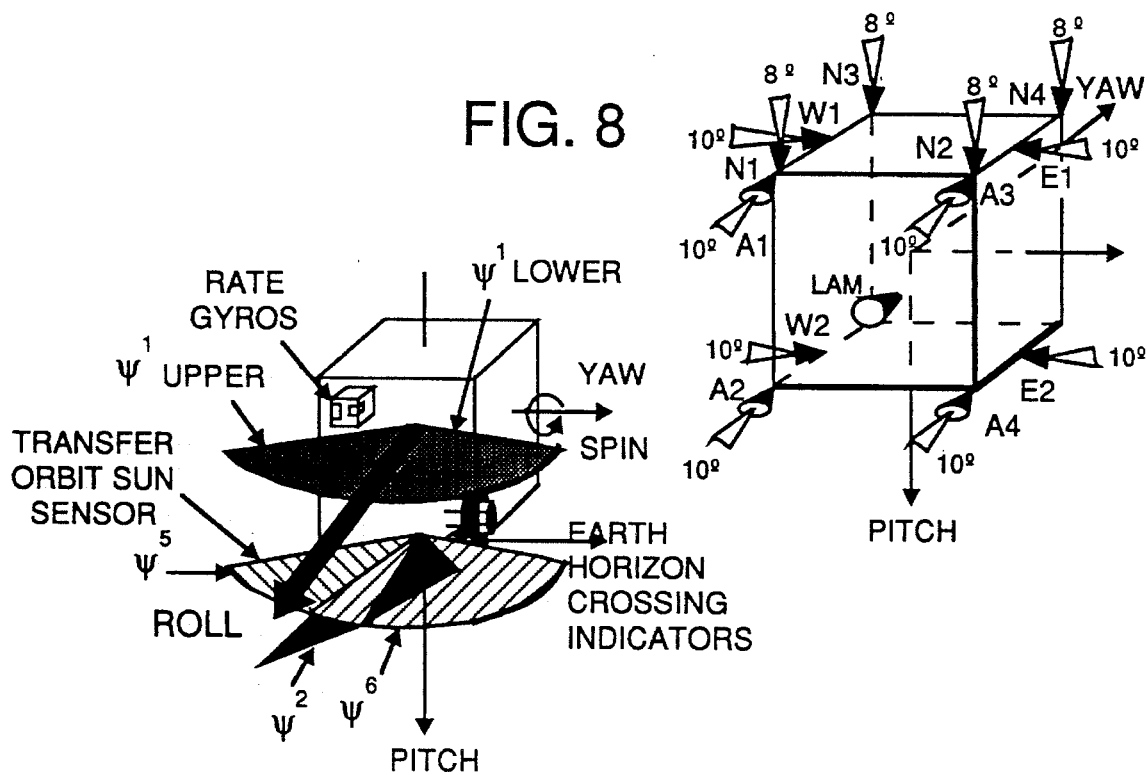
FIG. 8 illustrates the transfer orbit sensor actuator mounting geometry of the spacecraft.

The LAM thruster provides the primary Delta-V capability with axial thrusters preferably providing backup Delta-V capability. Four axial thrusters are used as primary roll/pitch control actuation whereas the north thrusters are used to control spin (body z) axis. The thruster selection and thruster on-time computation are performed optimally on-board the spacecraft to minimize fuel consumption using optimal thruster selection (OTS). The transfer orbit sensor actuator mounting geometry is illustrated in FIG. 8.

The SAW controller performance is summarized in Table 1a and Table 1b. The attitude pointing is tabulated under different transfer orbit phases.

TABLE 1a

Active Transfer Orbit Error Allocation and Pointing Performance

| Error Allocation/ Performance Error Sources | Attitude Error Allocation | Predicted Pointing Performance — Attitude propagation w/gyros No attitude update | On-board attitude propagation & updates | Remarks |
|---|---|---|---|---|
| Attitude Determination | 1.2° | 1.20° ground attitude determination | 0.25° | HCI/Aspect Sensor noises incl., uncalibrated errors incl. |
| Capture/Coast Phase Control Error | 1.5° | 0.7° | 0.03° | Worst case error includes error due to wobble, nutation and mass properties |
| Reorientation Phase Control Error | 1.5° | 0.28° | 0.03° | Phase angle error, cross axis error and residual nutation |
| LAM Burn Control Error | 1.5° | 0.17° | 0.17° | Worst case LAM thrust axis random walk due to p.p. variation, uncompensated gyro scale factor noise |
| LAM Misalignment | 0.6° | 0.60° | 0.60° | DI spec requirement |

TABLE 1a-continued

Active Transfer Orbit Error Allocation and Pointing Performance

| Error Allocation/ Performance Error Sources | Attitude Error Allocation | Predicted Pointing Performance | | Remarks |
|---|---|---|---|---|
| | | Attitude propagation w/gyros No attitude update | On-board attitude propagation & updates | |
| TOTAL (RSS) REQUIREMENT | 2.9° | 1.54° | 0.67° | >2° error margin |

TABLE 1b

Active Transfer Orbit Fuel Penalty vs. Allocation

| Transfer Orbit Operation | Fuel Allocation | Fuel Consumption | Remarks |
|---|---|---|---|
| Capture | 0.25 Kg | <0.2 Kg | Worst case wobble of 20° and nutation of 5° at 4 rpm |
| Precession | 0.01 Kg/deg | <0.0006 Kg/deg | Precession performed at ⅓ rpm |
| LAM | 7.5 Kg/hr | <3.4 Kg/hr | LAM performed at ⅓ rpm with assumed axial thruster ISP of 250 lb-sec vs. LAM ISP of 310 |
| Coast | 0.5 Kg/hr | <0.04 Kg/hr | Coast operation is assumed to be at ⅓ rpm |

A number of important design issues have been examined in sufficient detail to optimize the current SAW controller 12 structure. The resolution of these issues is summarized in Table 2. A brief explanation is provided below:

(a) Control system interaction with liquid slosh—A linearized pendulum model with the pendulum mass and length corresponding to UHF propellant tank and PMD geometry configurations under various fraction fill conditions has been utilized in order to define the controller bandwidth to minimize closed loop controller interaction with liquid motion under all transfer orbit phases. The bandwidth of the control system has been chosen so that the mode is actively phase-stable. A phase-lead notch has been incorporated in the design to provide additional phase lead during LAM burn, if required. The frequency of the notch filter is chosen such that the system stability is assured with a 40% uncertainty in predicting the slosh frequency.

(b) An on-board attitude determination capability has been incorporated to meet the system goals under nominal and anomalous conditions. The gyro-data is utilized to generate z-axis predicted attitudes. The predicted attitudes are updated with aspect sensor and HCI measurements to provide good z-axis attitude estimates about a nominal attitude reference. Attitude predictions (sun-polar separation angle, aspect angle estimates etc.) from ground-based attitude determination software can be compared with the output of the on-board attitude determination data to ascertain spin axis attitude error during any of the transfer orbit phases. Simulation results and error analyses have shown that the total on-board attitude determination error is less than 0.25°.

(c) Accuracy of the on-board Euler-based attitude propagation with three axis gyros, utilized for attitude determination, is more than adequate to meet design goals under all control phases. The quaternion or improved direction cosine-based attitude propagation, provides marginal accuracy improvement at a cost of increased complexity. The gyro misalignment data (if available) and gyro initial bias estimates can be uplinked to initialize gyro bias estimation algorithms. Since the spacecraft is spinning about z-axis (⅓ rpm–10 rpm), the z-axis attitude (roll/pitch) errors due to the gyro cross-axis alignments, gyro bias, gyro scale factor uncertainty and ASDR/AIDR uncertainties is not significantly effected. Note the fact that, unlike a nonspinning configuration, the gyro error sources (in spinning configuration) will generate a constant small hang-off in roll/pitch attitude given by:

$$\left( \text{error} = \frac{\text{aggregate gyro rate errors}}{\text{spin rate}} \right).$$

In a nonspinning configuration, the attitude error would be integrated with time. The yaw gyro bias is calibrated using $\psi_1$ sun sensor output. The yaw gyro bias calibration is required because the integrated yaw gyro output provides the spin phase angle reference for incremental precession maneuver. The roll/pitch gyro bias calibration capability has been provided to accommodate attitude referencing during non-spinning configuration following SAW operations (sun requisition). Since the large angle maneuver during transfer orbit is performed as a series of incremental small angle precessions to minimize fuel interactions, the Euler-based attitude propagation is found to be the optimum solution.

(d) At least 100% margin in control torque authority is available against a worst case LAM offset of 0.7" with a LAM misalignment of 0.6° and a product of inertia of 25 slug-ft$^2$.

(e) Fault detection and redundancy management is accomplished by switching control to a redundant string of SCP, IRU and a set of thrusters following a detection of failure by the ground. In order to allow maximum recovery time, it is advisable to power up only one SCP and IRU at a time, to minimize power and thermal loads. However, the control system architecture is compatible with dual SCP/IRU in master/redundant configurations. Some of the fault detection checks for out-of-bounds limits on rate and attitude are available in ascent mode processing.

(f) Impact on flight software development associated with transfer orbit operation is minimized by constraining transfer orbit attitude determination and control algorithms to be compatible, to a large extent, with the UHF-F/O unified state estimator and controller of FIG. 5. The unified estimator-controller architecture provides essential sensing, attitude determination and control actuation for all modes including transfer orbit. This minimizes the overall flight software development impact in terms of the throughput, code size, and unit/MST testing. The impact on the ground software is minimized by an active transfer orbit control strategy similar to a passively spinning spacecraft so that a substantial amount of the on-board software processing required to support ground attitude determination can be utilized for on-board attitude determination.

(g) The robustness of the control system to parameter variations has been accommodated by incorporating adequate gain and phase margins. The recommended controller structure of a rate, position and acceleration feedback is not only optimal, but may be needed to meet stringent pointing performance goals.

(h) Fuel optimization during active control has been accommodated by providing a design that can operate over a significant spin speed range (0–4 rpm). In this regard, the fuel penalty associated with compensating an unbalanced spacecraft increases with square of the spin speed. However, the attitude determination accuracy also increases higher spin speed. Thus, for a fuel-optimized transfer orbit, good sun configurations (i.e. coast phase), precession to LAM burn attitude phase and LAM burn to LAM burn phase, the spin speed should be set at ⅓ rpm unless HCI data is to be utilized to augment attitude determination. Since good chord data is available at spin speed around 1 rpm, the on-board attitude updates with HCI data can then be realized by spinning up to 1 rpm. If fuel penalty is not an issue, the active transfer orbit operation can be simplified by performing all operations including LAM maneuver at 1 rpm. However, as noted earlier, the attitude updates with sun aspect sensor measurements can be performed at spin speed as low as ⅓ rpm.

(i) Optimized jet selection for OTS during LAM and coast operation have been addressed by providing two different thruster jet selections. One jet selection is provided for LAM operation, such that fuel consumption is optimized by preferential selection of axial thruster to augment LAM thruster at any wobble torque phase angle in the spin phase. Another jet selection, for OTS, has been provided for non-LAM operation for operational flexibility. Three additional jet selections are utilized to provide gradual axial thrust throttling under ground control.

TABLE 2

Summary of SAW Designs Issues and Resolutions

| SAW Design Issue | Primary Area of Concentration | Resolution/ Performance Realization |
|---|---|---|
| S/C slosh dynamic interaction with control during transfer orbit Impact on PMD functioning | Closed loop propellant interaction with control system Prop slosh model (flow 3-D/pendulum parameters) Experimental slosh frequency damping determination | No undesirable impact due to closed-loop controller interaction during any of the SAW phases Gradual axial throttling, before turning LAM thruster, during LAM phase Small incremental precession steps, gradual despin/spinup Active phase stable controller with notch filter capability, if required Low bandwidth, gain stabilization capability available with quad filter to roll-off undesirable modes |
| Attitude propagation | Inertial attitude estimates Quaternion/Euler | On-board estimator propagates inertial attitude estimates using gyro data with an accuracy comparable to quaternion-based attitude propagation |
| Attitude determination | Ground attitude determination accuracy, real time support availability (via MUS/DSM) on-board attitude determination with aspect angle and chord measurements | SAW is compatible with ground attitude determination with HCI/SS (in conjunction with on board wobble/nutation estimates), ground provides independent attitude predicts during all ascent phases |

TABLE 2-continued

Summary of SAW Designs Issues and Resolutions

| SAW Design Issue | Primary Area of Concentration | Resolution/ Performance Realization |
| --- | --- | --- |
| | | On-board attitude determination capability with HCl/SS provided to minimize performance risks. |
| Gyro, HCl, sun sensor performance | Random walk, drift calib, alignment, ASDR, AIDR High freq/DC Wander, output vs. slope for SS | Gyro performance parameters are not a significant factor in yaw under spinning configuration in roll/pitch, an influencing factor for precession maneuver for spin phase referencing Yaw gyro bias estimation capability has-been provided |
| Primary disturbances | LAM offset/unbalanced torque Phase of LAM static offset torque in roll/pitch | Controlled by spesc; at least 200% control torque margin over the disturbance torque available Disturbance torque can be reduced with reduced spin speed |
| Primary disturbances Spin rate optimization | Unbalance dist torque vs. fuel penalty vs. attitude determination accuracy | Attitude determination with Barnes HCl at 1–4 rpm; Precession/Coast/LAM preferred at ⅓ rpm, Nonlinear sim results have characterized performance |
| Control stabilization technique | Rate feedback Rate and position feedback Rate, position and acceleration feedback | Rate feedback alone will not meet UHF requirements Chosen rate, position and acceleration feedback during all phases of SAW Position and acceleration feedback can be eliminated if desired by enabling a discrete flag called TANC |
| Control system stability | Linear continuous domain root locus Discrete Z-plane analysis with notch filter Nonlinear describing function analysis | 12–20 dB gain margin 40–60 deg phase margin Nonlinear stability anal. predicts limit cycle oscillation at frequency other than slosh frequency |
| Control actuation Fuel optimization | Control authority, fuel penalty Fuel penalty vs. jet selection | 5 lb axial thrusters (RP); N thrusters (spin axis); Axial thruster augments ΔV during LAM Two separate jet selection (LAM/no LAM) to optimize fuel consumption |
| Induced Delta-V | Specific impulse/coning loss/fuel optimization | 110 lb thrust LAM engine w/5 lb biprop (backup), minimum thruster on-time during LAM is 80 msec to realize high IsP |
| Flight software implementation | PROM storage Throughput | Significant usage of on-station software (unified estimator/controller) minimizes code expansion SAW sequencing logic provides transfer orbit-unique on-board software processing Adequate throughput margin |

TABLE 2-continued

Summary of SAW Designs Issues and Resolutions

| SAW Design Issue | Primary Area of Concentration | Resolution/ Performance Realization |
|---|---|---|
| Ground S/W interface | Operational procedure, OOH/SEH | available<br>Initial OOH inputs provided.<br>SAW-specific command/<br>telemetry in place |
| Fault protection and redundancy management | Fault detection/response via ground | Redundant string (SCP/IRU/Thruster) switching via ground fault detection during LAM, tumble recovery plan in work |

Fundamentally, the spin axis attitude and wobble control system design can be described effectively by three key functional components. These are (a) state estimator; (b) linear controller with thruster actuation; (c) SAW sequencing logic that sets up the initial condition (or reference point) for the estimator/controller. The detailed discussion below of the functional components will start with the definition of attitude determination (that includes coordinate frame definition, prediction/correction/measurement equation development), attitude control and SAW sequencing algorithm that initializes the unified estimator/controller. It should be recalled once again the transfer orbit-unique functions are implemented in the SAW sequencing algorithm. To rationalize the associated theoretical formulation, the coordinate frame/Euler angle definition and simplified solution of the rigid body equation are presented before estimator/controller algorithms.

Figure 9:
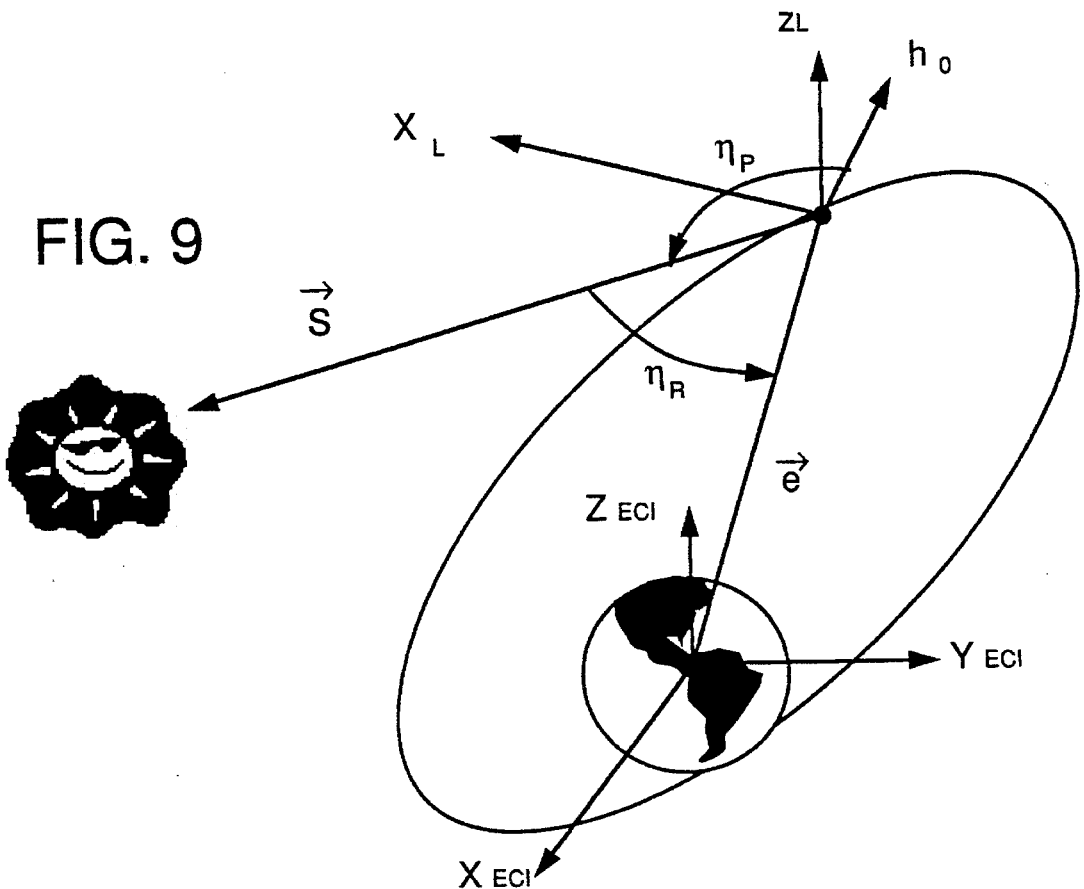
FIG. 9 illustrates the Earth centered inertial ("ECI") and local inertial reference frames used for defining the orientatin of the spin axis.

Two Euler angles are required to define the orientation of the spin axis. Since the solar aspect sensor provides a measure of the angle between the spin axis and sunline directly, it is appropriate to choose a coordinate system with this angle as one of the Euler angles. Consider the orientation shown in FIG. 9. An Earth Centered Inertial ("ECI") frame will be defined with $X_{ECI}$ inertial axis pointed to the first point of Aries, $Z_{ECI}$ pointed south and $Y_{ECI}$ completing the right-handed co-ordinate system. Next, the local inertial frame ($X_L, Y_L, Z_L$) will be defined to specify the orientation of the momentum vector $\vec{h}$. The instantaneous body orientation with respect to the local inertial reference frame can then be specified with respect to a set of Euler sequences of rotation.

Figure 10:
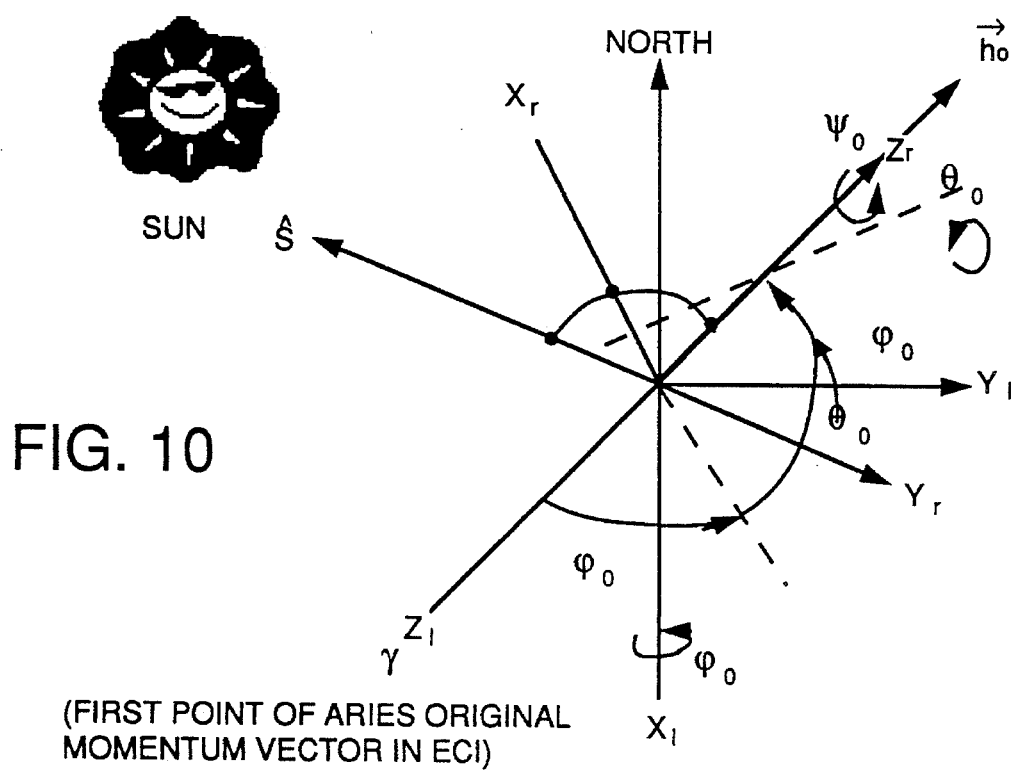
FIG. 10 illustrates the SAW controller local inertial frame with respect to the ECI frame.

In order to transform from spacecraft centered standard inertial frame to local reference inertial frame (as shown in FIG. 10):

1. Rotate by $-\omega_o$ about $X_I$ $\omega_o$ right ascension of $\vec{h}$
2. Rotate $-\theta_0$ about $Y^1$ $\theta_0$ is declination of $\vec{h}$
3. Rotate by $\phi_o$ about $Z_r$ so that sun is in $+X_r$ half of $X_r$-$Z_r$ plane Two identical Euler sequences can be utilized to specify the body reference in the local inertial frame. These are described below with reference to FIG. 11.

Sequence A: 3-2-1- Euler Sequence

1. Rotate by $\psi$ about $Z_r$
2. Rotate $\theta_p$ about $Y^1$
3. Rotate by $\phi_p$ about X Sequence B: 1-2-3- Euler sequence with transformation 1. Rotate by $\phi$ about X
2. Rotate $\theta$ about $Y^1$
3. Rotate by $\psi$ about $Z_r$
4. Transform $\phi/\theta$ to $\phi_p/\theta_p$ such that $$\begin{bmatrix} \phi_p \\ \theta_p \end{bmatrix} = \begin{bmatrix} \cos\psi & \sin\psi \\ -\sin\psi & \cos\psi \end{bmatrix} \begin{bmatrix} \phi \\ \theta \end{bmatrix}$$

$\phi, \theta$=Inertial attitude of z-axis
$\phi_p, \theta_p$=Body attitude (estimator reference attitude)

For small angle rotations of fp and qp, above sequences are equivalent.

The following will provide a simplified solution of unforced dynamics and kinematic equations. Roll pitch body rates ($\omega_x, \omega_y$) and intertial attitudes ($\phi_p, \theta_p$) due to a wobble and nutation are given as:

$$\omega_1 = \omega_1(0)\cos\lambda t + \omega_2(0)\sin\lambda t + \frac{a_2^d}{(I_T - I_S)\omega_s} \quad (12.1)$$

$$\omega_y = \omega_2(0)\cos\lambda t - \omega_1(0)\sin\lambda t + \frac{a_2^d}{(I_T - I_S)\omega_s} \quad (12.2)$$

$$\phi_1 = \frac{1}{\omega_N}[\omega_1(0)\sin\omega_N t + \omega_2(0)\cos\omega_N t] + \quad (12.3)$$

$$\frac{a_1^d}{(I_T - I_S)\omega_s^2}\sin\omega_s t + \frac{a_2^d}{(I_T - I_S)\omega_s^2}\cos\omega_s t$$

$$\theta_1 = -\frac{1}{\omega_N}[\omega_1(0)\cos\omega_N t - \omega_2(0)\sin\omega_N t] - \quad (12.4)$$

$$\frac{a_1^d}{(I_T - I_S)\omega_s^2}\cos\omega_s t + \frac{a_2^d}{(I_T - I_S)\omega_s^2}\sin\omega_s t$$

$$\phi_p = \frac{1}{\omega_N}[-\omega_1(0)\sin(\omega_s - \omega_N)t + \quad (12.5)$$

$$\omega_2(0)\cos(\omega_s + \omega_N)t] + \frac{a_2^d}{(I_T - I_S)\omega_s^2}$$

$$\theta_p = \frac{1}{\omega_N}[\omega_1(0)\cos(\omega_s - \omega_N)t + \quad (12.6)$$

$$\omega_2(0)\sin(\omega_s + \omega_N)t] + \frac{a_1^d}{(I_T - I_S)\omega_s^2}$$

where:

$\lambda$=Body nutation freq=$(\delta-1)\omega_s$; $\omega_s$=Spin freq;

$\omega_N$ = Inertial Nutation Freq = $\frac{I_s}{I_T} \cdot \omega_s$ $a_1{}^d \equiv I_{23}\omega_s{}^2$ = Wobble roll torque; $a_2{}^d \equiv -I_{13}\omega_s{}^2$ = Wobble pitch torque;

$I_T$ = Transverse Inertia; $I_s$ — Spin Inertia $\omega_x(0)$, $\omega_y(0)$ — Initial Transverse Rates The simplified solution reveals the nature of the expected rate and attitude time history under force-free condition. The transverse rate time history is at the body nutation frequency ($\lambda$) with a time-invariant wobble term. The time history of the inertial attitude ($\phi$, $\theta$) demonstrates body rate components at the inertial nutation frequency and wobble acceleration components at the spin frequency. However, the body attitude $\phi_p$, $\theta_p$, components consist of rate terms at the body modulation frequency ($\omega_s \pm \omega_N$) with a fixed wobble term.

The solution for body attitude suggests that the wobble term can be compensated by estimating the wobble acceleration term. The nutation terms can be estimated and compensated without any appreciable attitude error due to the availability of a gyro and gyro-based kinematics.

The state estimator prediction model 16 is based on the linear dynamic/kinematic model defined below. The attitude determination algorithm involves updating the estimator open loop model defined below with appropriate sensor measurement residuals.

Dynamics:     Kinematics:     (13.1)

$\dot{\omega}_1 = -\lambda_1\omega_2 + a_{d1} - a_{c1}$     $\dot{\phi}_p = \omega_3\theta_p + \omega_1$ $\dot{\omega}_2 = \lambda_2\omega_1 + a_{d2} - a_{c2}$     $\dot{\theta}_p = -\omega_3\phi_p + \omega_2$ $\dot{\omega}_3 = 0$     $\dot{\psi} = \omega_3 \approx \omega_s$ Acceleration:

$\dot{a}_{d1} = 0; a_{d1}(0) = \frac{I_{23}\omega_3{}^2}{I_1}$ $\dot{a}_{d2} = 0; a_{d2}(0) = -\frac{I_{13}\omega_3{}^2}{I_2}$ Where: $\lambda_1 = -\omega_3\left[\frac{I_2 - I_3}{I_1}\right]$; $\lambda_2 = \omega_3\left[\frac{I_3 - I_1}{I_2}\right]$ Note once again that $\omega_1$, $\omega_2$, $\omega_3$ are body rates; $\phi_p$, $\theta_p$ and $\psi$ are body angles; $a_{d1}$ and $a_{d2}$ are body accelerations.

The inertial Euler attitudes ($\phi_I$, $\theta_I$) of the z-axis are related to the body attitudes $\phi_p$, $\theta_p$ according to the following relationship:

$$\begin{bmatrix} \phi_I \\ \theta_I \end{bmatrix} = \begin{bmatrix} c\omega 3t & -s\omega 3t \\ s\omega 3t & c\omega 3t \end{bmatrix} \begin{bmatrix} \phi_p \\ \theta_p \end{bmatrix}$$

The predicted states are then updated with rate and position measurement residuals as follows:

$\dot{\hat{\omega}}_1 = -\lambda_1\hat{\omega}_2 + k_I(\omega_1{}^m - \hat{\omega}_1) + \hat{a}_I - a_{cx}$ $\dot{\hat{\omega}}_2 = \lambda_2\hat{\omega}_1 + k_2(\omega_2{}^m - \hat{\omega}_2) + \hat{a}_2 - a_{cy}$ $\dot{\hat{\omega}}_3 = g_3(\omega_3{}^m - \hat{\omega}_3)$ Body Attitude Updates:     Body Acceleration Updates: (13.2)

$\dot{\phi} = \hat{\omega}_3\theta + \hat{\omega}_1 + k_1{}^\phi(\phi_m - \hat{\phi})$     $\dot{\alpha}_1 = k_1{}^\alpha(\omega_1{}^m - \hat{\omega}_1)$ $\dot{\theta} = -\hat{\omega}_3\phi + \hat{\omega}_2 + k_2{}^\theta(\theta_m - \hat{\theta})$     $\dot{\alpha}_2 = k_2{}^\alpha(\omega_2{}^m - \hat{\omega}_2)$ $\dot{\psi} = \hat{\omega}_3 + k_3{}^\psi(\psi_m - \hat{\psi})$ where gyro rate measurements are given by $\omega_1{}^m$, $\omega_2{}^m$, $\omega_3{}^m$. Note that equation (13.2) defines the estimates of body rates $\hat{\omega}_1$, $\hat{\omega}_2$, $\hat{\omega}_3$, body attitudes $\Phi$, $\theta$, $\psi$ and body accelerations ($\hat{\alpha}_1$, $\hat{\alpha}_2$). $\Phi$ $\Lambda \theta$ are the updates of predicted body attitudes $\phi_p$, $\theta_p$ respectively. Roll and pitch measurement changes $\Phi_m{}^1$, $\theta_m{}^1$ from referenced predicted chord measurement $\phi_o$ and sun aspect angle measurement $\theta_o$ are given as $\Phi_m{}^1$ = roll_slope $[\hat{\omega}_3 t_{HCI} - \Phi_o]$; $\Phi_m{}^1$ = pitch_slope $[\hat{\omega}_3 t_{\psi-\psi} - \theta_o]$.

Equivalent body measurement changes $\phi_m$, $\theta_m$ required to update predicted attitudes $\phi_p$, $\theta_p$ are given by:

$$\begin{bmatrix} \phi_m \\ \theta_m \end{bmatrix} = \begin{bmatrix} c\hat{\psi} & s\hat{\psi} \\ -s\hat{\psi} & c\hat{\psi} \end{bmatrix} \begin{bmatrix} \phi_m{}^1 \\ \theta_m{}^1 \end{bmatrix}$$ (13.3)

where $\hat{\psi}$ is the estimated spin phase angle.

Note that $t_{HCI}$ and $t_{\psi-\psi}$ are the chord and aspect time measurements, roll-slope and pitch_slope are the slopes at operating point that relate measurement changes to attitude changes. The state estimator 16, as defined in the embedded software, is depicted in FIG. 12 and FIG. 13. The following parameters of the state estimator 16 are initialized with the selection of Ascent_Mode mass properties commanded and estimated body rates wobble accelerations sine, cosine and cotangents of every cant angles of HCI & $\psi$ sensors At every real time interupt ("RTI") following sun pulse (during capture phase with control deactivated), the system momentum is computed as follows:

$$\hat{\underline{H}} \overset{\Delta}{=} \begin{bmatrix} \hat{H}_1 \\ \hat{H}_2 \\ \hat{H}_3 \end{bmatrix} = I \begin{bmatrix} \hat{\omega} \\ \hat{\omega} \\ \hat{\omega} \end{bmatrix} \quad I: \text{moments of inertia dyadic}$$

Estimate of yaw body rate: $\hat{\omega}_3 = \hat{\omega}_3 \bullet$ Estimated Cone_Angle Note that $\hat{\omega}_1$, $\hat{\omega}_2$ are the filtered gyro outputs, $\hat{\omega}_3$ is the estimated yaw body rate ($\omega_3{}^s$) based on the sun sensor output and the estimated cone_angle (($\Phi^2 + \theta^2$)$^{1/2}$).

The z-axis attitudes with respect to H are initialized in the local inertial frame as:

Estimate of roll attitude $\Phi = \tan^{-1}(\hat{H}_2/\hat{H}_3) \cong \hat{H}_2/\hat{H}_3 - (\hat{H}_2/\hat{H}_3)^3/3$ Estimate of pitch attitude:

$\theta = \tan^{-1}(-\hat{H}_1/\hat{H}_3) \cong -\hat{H}_1/\hat{H}_3 - (-\hat{H}_1/\hat{H}_3)^3/3$ These attitude initializations are carried out only during the phase known as "waiting to be captured." Once thrusters are activated, these initializations are no longer performed. Since the on-board arctangent function is expensive from the throughput point-of-view, an approximation of this function, as defined above, is preferably implemented. The error associated with this approximation is estimated to be 0.02° for a 20° wobble angle. Note that the initializations of the estimator attitude states outlined above involve error associated with the mass property uncertainties. This uncertainty of 2.5% forms the largest error during the capture phase.

The state estimator 16 state variables are propagated as:

$$\hat{\alpha}_1(K, -) = \hat{\alpha}(K-1, +) \quad (16.1)$$

$$\hat{\alpha}_2(K, -) = \hat{\alpha}(K-1, +) \quad (16.2)$$

$$\hat{\alpha}_3(K, -) = \hat{\alpha}(K-1, +) \quad (16.3)$$

Defining the state estimator variables as:

$\hat{\alpha}_1, \hat{\alpha}_2, \hat{\alpha}_3$ = Acceleration estimates in deg/sec$^2$
$\hat{\omega}_1, \hat{\omega}_2, \hat{\omega}_3$ = Rate estimates in deg/sec
$\hat{\phi}, \hat{\theta}, \hat{\psi}$ = Body angle estimates in deg $$\hat{\omega}_1(K, -) = \hat{\omega}_1(K-1, +) + \begin{bmatrix} \text{dynamic} \\ \text{terms} \end{bmatrix} + \begin{bmatrix} \text{disturbance} \\ \text{torque term} \end{bmatrix} + \begin{bmatrix} \text{control torque} \\ \text{feedforward} \\ \text{term} \end{bmatrix} \quad (16.4)$$

$$= \hat{\omega}_1(k-1, +) + \frac{(I_2 - I_3)}{I_1} \hat{\omega}_2 \delta T \cdot DTR + \hat{\alpha}_1 \cdot \Delta T + \Delta\omega_1^t$$

$\Delta = \hat{\omega}_1(k-1, +) + \omega_1^{tot}$ $$\hat{\omega}_2(K, -) = \hat{\omega}_2(K-1, +) + \begin{bmatrix} \text{disturbance} \\ \text{torque term} \end{bmatrix} + \begin{bmatrix} \text{control torque} \\ \text{feedforward term} \end{bmatrix} \quad (16.5)$$

$$= \hat{\omega}_2(K-1, +) + \frac{(I_3 - I_1)}{I_2} \hat{\omega}_1 \Delta T \cdot DTR + \hat{\alpha}_2 \cdot \Delta T + \Delta\omega_2^t$$

$\Delta = \hat{\omega}_2(K-1, +) + \Delta\omega_2^{tot}$ $$\hat{\omega}_3(K, -) = \hat{\omega}_3(K-1, +) + \begin{bmatrix} \text{dynamic} \\ \text{terms} \end{bmatrix} + \begin{bmatrix} \text{disturbance} \\ \text{torque term} \end{bmatrix} + \begin{bmatrix} \text{control torque} \\ \text{feedforward} \\ \text{term} \end{bmatrix} \quad (16.6)$$

$= \hat{\omega}_3(K-1, +) + \hat{\alpha}_3 \cdot \hat{\omega}_3 \cdot \Delta T + \Delta\omega_3^t$ $\Delta = + \hat{\omega}_3(K-1, +) + \Delta\omega_3^{tot}$ $$\hat{\phi}(K, -) = \hat{\phi}(K-1, +) + \hat{\omega}_1(K-1, +)\Delta T + \hat{\omega}_2(K-1, +)\theta(K-1, +)\Delta T + \frac{1}{2} \Delta T \cdot \Delta\omega_1^{tot} \quad (16.7)$$

$$\hat{\theta}(K, -) = \hat{\theta}(K-1, +) + \hat{\omega}_2(K-1, +)\Delta T + (-\hat{\omega}_3)(K-1, +)\hat{\phi}(K-1, +)\Delta T + \frac{1}{2} \Delta T \cdot \Delta\omega_2^{tot} \quad (16.8)$$

$$\hat{\psi}(K, -) = \hat{\psi}(K-1, +) + \hat{\omega}_3(K-1, +)\Delta T + \frac{1}{2} \Delta T \cdot \Delta\omega_3^{tot} \quad (16.9)$$

$\Delta T = 1 \ RTI \ \text{interval} = 32 \ \text{msec}$

The state estimator 16 states are updated as follows:
Acceleration updates:

$$\hat{\alpha}_1(K, +) = \hat{\alpha}_1(K, -) + K_1^\alpha(\omega_1^m - \hat{\omega}_1(K, -))$$

$$\hat{\alpha}_2(K, +) = \hat{\alpha}_2(K, -) + K_2^\alpha(\omega_2^m - \hat{\omega}_2(K, -)) \quad (16.10)$$

Acceleration estimates are primarily due to wobble and LAM static offsets.
Rate Updates:

$$\hat{\omega}_1(K, +) = \hat{\omega}_1(K, -) + K_1^R(\omega_1^m - \hat{\omega}_1(K, -))$$

$$\hat{\omega}_2(K, +) = \hat{\omega}_2(K, -) + K_2^R(\omega_2^m - \hat{\omega}_2(K, -))$$

$$\hat{\omega}_3(K, +) = \hat{\omega}_3(K, -) + K_3^R(\omega_3^m - \hat{\omega}_3(K, -)): \quad (16.11)$$

if gyro is selected for yaw axis $$\hat{\omega}_3(K, +) = \hat{\omega}_3(K, -) + K_{33}^\omega(\psi_m - \hat{\psi}(K, -)):$$

if gyro is not selected for yaw axis
$\omega_1^m, \omega_2^m, \omega_3^m$, are roll and pitch gyro measurements after alignment and bias corrections.

$$\psi_m = \omega_3(t - t_{st_i})$$

Where $\psi_m$ is computed only at RTI following sun pulse;
$t_{st_i}$ is time of $i^{th}$ sun pulse t is current time
$\hat{\psi}(K, -)$ is adjusted for $2\pi$ ambiguity
Attitude updates:

$$\hat{\phi}(K, +) = \hat{\phi}(K, -) + K_1^\Phi(\Phi_m - \hat{\Phi}(K, -))$$

$$\hat{\theta}(K, +) = \hat{\theta}(K, -) + K_2^\theta(\theta_m - \hat{\theta}(K, -)) \quad (16.12)$$

$$\hat{\psi}(K, +) = \hat{\psi}(K, -) + K_3^\Psi(\psi_m - \hat{\psi}(K, -))$$

where the inertial roll ($\Phi_m^1$) and pitch ($\theta_m^1$)

$$\Phi_m^1 = (\hat{\omega}_3 t_{HCI} - \Phi_0) \cdot \text{Roll\_slope}$$

$$\theta_m^1 = (\hat{\omega}_3 t_{\psi - \psi} - \theta_0) \cdot \text{Pitch\_slope} \quad (16.13)$$

The equivalent measurement in body coordinate is obtained as:

$$\begin{bmatrix} \phi_m \\ \theta_m \end{bmatrix} = \begin{bmatrix} C\psi & S\psi \\ -S\psi & C\psi \end{bmatrix} \begin{bmatrix} \phi_m^1 \\ \theta_m^1 \end{bmatrix} \quad (16.14)$$

Various updating gains associated with the estimator definition are set forth later in Table 3a.

It should be noted that the attitude updates are performed at the RTI based on the desired z-axis pointing with respect to earthline captured when sensor is valid. Key variables used above are defined as follows;

$\theta_o$=the desired aspect angles $\phi_o$=ideal chord prediction generated on-board every 8 sec; $\hat{\omega}_3$=spin rate est.

$t_{HCI}$=chord time measurement $(t_{TE}-t_{LE})$ (secs)

$t_{\psi-\psi}$=aspect measurement $(t_{\psi-\psi^2}, t_{\psi-\psi^2}, t_{\psi-\psi^6})$ Roll-slope and pitch-slope are the gradients (rate of change) of measurement with respect to attitude at given $\phi_o$ and $\theta_o$ $(\phi_m-\Phi)$=Roll attitude measurement residual is adjusted for sign due to equator crossing with proper sign of $K^\Phi$ based on the computed time derivative of the chord $(\phi_o)$ The attitude determination accuracy with HCI data depends very much on the spin speed. The accuracy of the attitude determination is limited due to droop characteristics associated with HCI and SCP time of arrival circuit noise. The threshold for determining the earth leading edge and trailing edge (to establish the chordwidth) is set high enough such that false chord measurements can be avoided. Alternately, the digitized output of the HCI can be used to generate an estimate of the chord even at low spin speed. The digitized output of HCI is fed through an inverter logic that compensates for the droop to estimate the earth radiance profile. Once an earth input radiance profile is obtained, an appropriate thresholding logic can be used to generate the chord data for the attitude determination irrespective of the spin speed.

The estimate of the earth input radiance $\hat{v}$ is obtained from the digitized HCI measurement y is given as $x_1 = x_1 + \Delta T \bullet \text{DIGITIZED\_OUTPUT\_HCl}$ $x_2 = x_2 + X_1 \Delta T + A \bullet \text{DIGITIZED\_OUTPUT\_HCl}$ $X_3 = Ax_1 + x_2 \Delta T + x_3$ \quad (16.5)

$x_4 = Ax_2 + x_3 \Delta T + x_4$ $X = \text{DIGITIZED\_OUTPUT\_HCl} + Bx_1 \_ Cx_2 + Dx_3 + Ex_4$ \quad (16.6)

$\Delta T$=Estimator update period=0.032768 seconds

A=0.0005; B=0.3883; C=0.0589; D=0.0037; E= 0.0001 where $x_1, x_2, x_3, x_4$, are the state variables that compensates the HCI measurements due to its finite field of view and droop characteristics. Note the face that the coefficients used in the compensator model (equation 16.15) depends on an assumed HCI transfer function. The input earth radiance and estimated earth radiance are very close to each other at spin speeds of 4 rpm and ⅓ rpm.

The attitude determination of the z-axis has been formulated individually with respect to the sun alone (for good sun orientation) and with respect to the earth (for LAM burn). It should be noted that the perturbation equation of the z-Axis orientation defined by body angles $\phi$ and $\theta$ in the local inertial frame is observable (hence determinable) from single pitch measurement y (or aspect angle measurement, as shown below:

$\dot{\omega}_1 = -(\delta-1)\omega_3\omega_2 + \alpha_1^d$ $\dot{\omega}_2 = (\delta-1)\omega_3\omega_1 = \alpha_2^d$ $\dot{\phi} = \omega_3\theta + \omega_1$ $\dot{\theta} = -\omega_3\phi = \omega_2$ $y = \theta + \text{measurement\_noise}$ where
 $\theta$=aspect measurement
 $\alpha_1^d, \alpha_2^d$=wobble accelerations
 $\omega_1, \omega_2$=transverse rates
 $\omega_3$=spin rate
 $\delta$=spin to transverse inertia
 $\chi$=state vector
 $\underline{\alpha}$=disturbance acceleration
In state variable form:

$$\frac{d}{dt}\begin{bmatrix} \omega_1 \\ \omega_2 \\ \phi \\ \theta \end{bmatrix} = \quad (16.17)$$

$$\begin{bmatrix} 0 & -(\delta-1)\omega_3 & 0 & 0 \\ (\delta-1)\omega_3 & 0 & 0 & 0 \\ 1 & 0 & 0 & \omega_3 \\ 0 & 1 & -\omega_3 & 0 \end{bmatrix} \begin{bmatrix} \omega_1 \\ \omega_2 \\ \phi \\ \theta \end{bmatrix} + \begin{bmatrix} \alpha_1^d \\ \alpha_2^d \\ 0 \\ 0 \end{bmatrix}$$

$Y = [0 \; 0 \; 0 \; 1] \, [\omega_1 \; \omega_2 \; \phi \; \theta]^T + \text{noise}$ i.e.

$\underline{\dot{\chi}} = A\underline{\chi} + \underline{\alpha}$ $y = \underline{c}\chi + \text{noise}$ where (A, c) are system matrices.

The determinant of the observability matrix O is given as $$|O| = \left| \begin{bmatrix} c \\ cA \\ cA^2 \\ cA^3 \end{bmatrix} \right| = \sigma^2(\sigma-1)\omega_3^3 \quad (16.18)$$

The system represented by equation (16.17) is clearly observable provided $\omega \leqsymbol 0$) or $\sigma \leqsymbol 0$). Thus, the aspect measurement can be utilized to generate full estimate $\hat{x}$ of the state vector x. The attitude determination with respect to sun is usually performed once the spacecraft is captured. Similarly, the perturbation state vector HCI can be estimated from one HCI measurement since the system is also observable with one HCI measurement. The attitude determination with respect to earth is performed before the LAM burn when the z-Axis is precessed to the desired burn attitude. However, the attitude determination can also be performed under passive configuration using aspect sensors. The estimator states (position, rate and acceleration) can be updated with and without estimator initialization through capture phase processing.

The SAW controller 12 is based on a linear feedback of the estimated attitude, rate and acceleration of the respective roll, pitch and yaw body axes. The acceleration estimates ($\hat{\alpha}_1$, $\hat{\alpha}_2$) for the roll/pitch axes are primarily the estimates of the wobble acceleration, which is directly proportional to the magnitude of the product of inertia and square of the spin speed. During LAM burn, this acceleration estimate is augmented with body fixed acceleration caused by LAM engine offset and misalignment. For the yaw axis, no acceleration estimate is generated.

Figure 14:
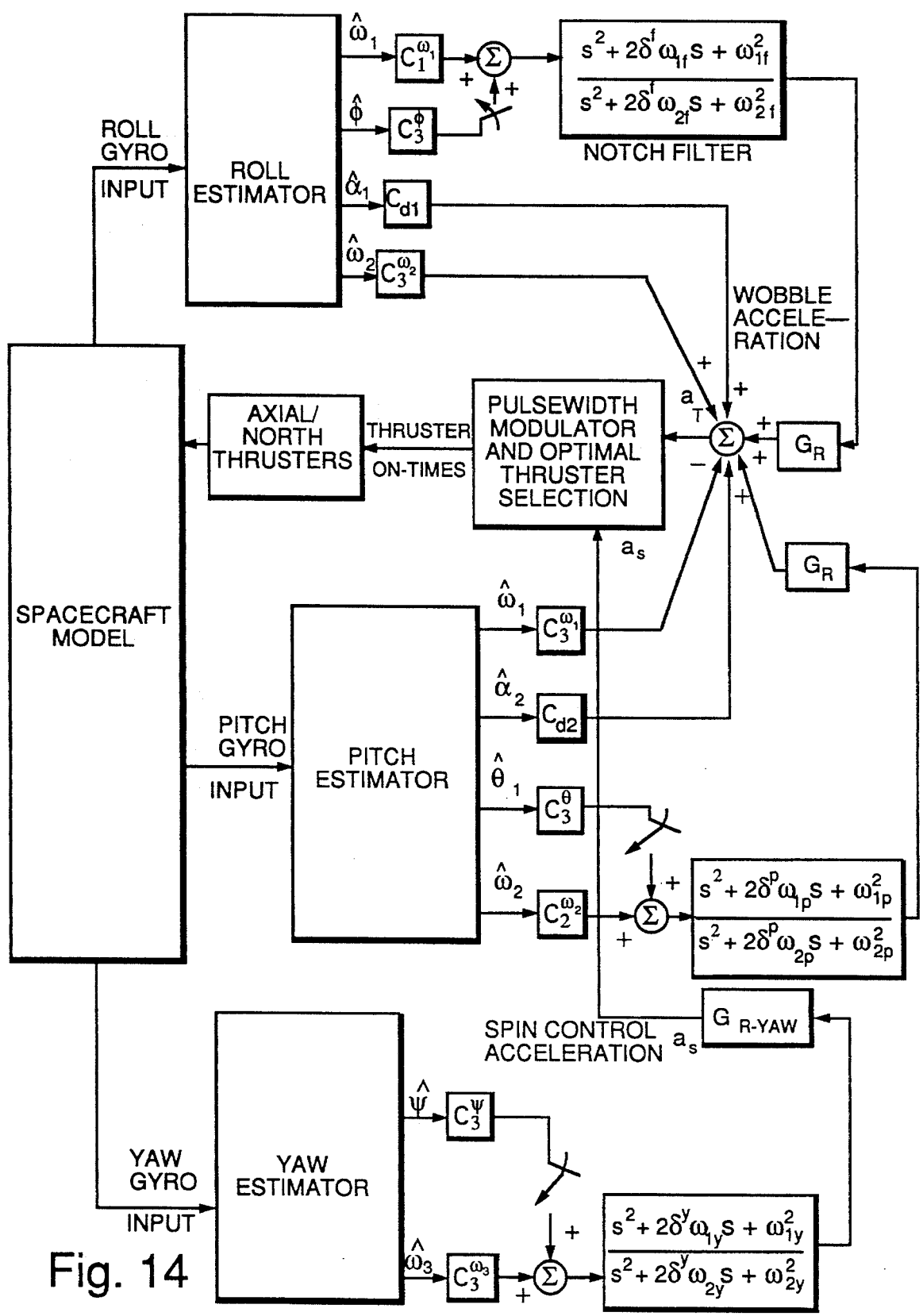
FIG. 14 provides a block diagram of the SAW controller architecture.

This linear combination of the estimated attitude, rate and acceleration, as shown in the SAW block diagram of FIG. 14, is used to generate a commanded rate increment for the respective body axis using the pulsewidth modulator. In addition, the pulse-width frequency modulator accumulates rate increments from previous controller cycles if the commanded rate increment is less than that corresponding to a minimum thruster on time. The pulse-width frequency modulator thus attempts to linearize an inherently nonlinear thruster duty cycle process. The commanded rate increments for the three axes are provided to the on-board optimal thruster selection logic (OTS). The OTS generates thruster on times for a set of thrusters to realize the commanded body rate increments while minimizing fuel consumption.

As shown in FIG. 14, the SAW controller 12 architecture provides phase lead capability using the notch filter for each of the body axes provided phase lead, if warranted. As mentioned before, slosh modes under no thrust are phase stabilized. Under thrust (i.e. LAM), slosh modes are also nominally phase-stabilized without a notch filter when a slosh modal damping of 2% is used. The model damping under thrust is predicted from experiment to be 4% [Reference 1]. In addition, it should be pointed out that the SAW controller architecture provides capability for a gain stabilization configuration, where the bandwidth adjustment gains ($G_R$, $G_{R-YAW}$) are adjusted along with filter coefficients (to convert the notch filter to a roll-off filter) to eliminate the slosh modes. However, the system transient performance, noise rejection and disturbance torque tracking capability are impacted significantly with a gain stabilization configuration.

An outline of control system design rationale and stability analyses is presented below for the sake of completeness.

$c_1^\Phi$, $c_2^\theta$, $c_3^\Psi$ represent position gains; $c_1^{\omega_1}$, $c_2^{\omega_2}$, $c_3^{\omega_3}$ represent rate gains; $c_{d1}$, $c_{d2}$, $c_{d3}$ represent acceleration gains; $c_1^{\omega_2}$, $c_2^{\omega_1}$ represent cross-coupling rate gains for the roll, pitch and yaw body axes. The transverse axis and spin axis bandwidths are controlled by $G_R$ and $G_{R-YAW}$ respectively. The transverse and spin axes accelerations, represented by $a_T$ and $a_S$ respectively, are formed by linear combinations of position, rate and accelerations as shown in FIG. 14. The transverse and spin accelerations are used by PFM/OTS to compute the on-times for the axial/north thrusters. It can be seen that notch filter provided for each axis has unique set of parameters. Its invocation can be controlled on axis by axis bases. Detailed definition of the controller parameters are provided later in Table 3b–c.

Since the SAW controller is to be able to operate over a spin speed of 0–4 rpm, a fixed gain controller structure is not optimal. The system response at low or zero spin speed is significantly different from that at high spin speed. At low spin speed, the SAW controller 12 behaves dominantly as a conventional rate and position controller. At high spin speed, the controller behaves more like a rate feedback. Thus, the rate bandwidth is linearly adjusted as a function of the commanded yaw spin speed.

The acceleration feedback is gradually decreased to zero as the spin speed reduces to zero. However, the acceleration feedback is always present during thrust (i.e. LAM) irrespective of the spin speed.

The cross coupling rate gain $c_1^{\omega_2}$, $c_2^{\omega_1}$ allows the controller 12 a capability to implement nutation free precession by nulling the induced true inertial rate.

The stability of the SAW controller 12 and associated parameter sensitivity have been addressed in three parts as follows:

Part I: A linear continuous domain root-locus analysis has been done to examine the behavior of eigenvalues of a closed-loop system with the system matrix A. The system defines the spacecraft dynamics/kinematics and the controller gains. The controller gains and system parameters (inertia ratio $\sigma$, slosh damping, etc.) are varied to examine closed-loop eigenvalues to characterize system robustness under different spin speeds. With linear position and rate feedback, the system is unconditionally stable.

Part II: A discrete linear Z-plane frequency response analysis has been performed to examine the phase margin/gain margin of the system under various spin speeds. The system matrix includes the discretized linear plant that includes rigid body and slosh modes with discrete estimator/controller appended. The eigenvalues of the total system matrix has been examined at various spin speeds. The discrete Z-plane analysis shown 12 dB to 20 dB gain margin with 40–60 degree phase margin over the spin speed of 0–4 rpm.

Part III: A nonlinear describing function analysis has been performed to gain insight into inherent limit cycle oscillation magnitude and frequency in a thrusting configuration. The linearized rigid body with slosh mode has been modelled with the linear SAW controller 12. The only nonlinearity assumed is the selected thruster minimum on-time. A simplified block diagram of nonlinear stability analysis is defined in FIG. 15. It should be noted that the block diagram defines a single-input describing function architecture. It is applicable when the spin speed is very low. The rationale for performing this analysis, other than what has already been mentioned above, is two-fold. First of all, it is desired to gain some insight into the expected phase loss if the duty cycle is less than minimum on-time. Secondly, if the minimum on-time during LAM burn is selected to be 80 msec to realize higher biprop thruster isp, the closed-loop control system performance in terms of steady-state limit cycle and limit-cycle frequency (i.e. nonlinear bandwidth) are important issues.

Figure 16:
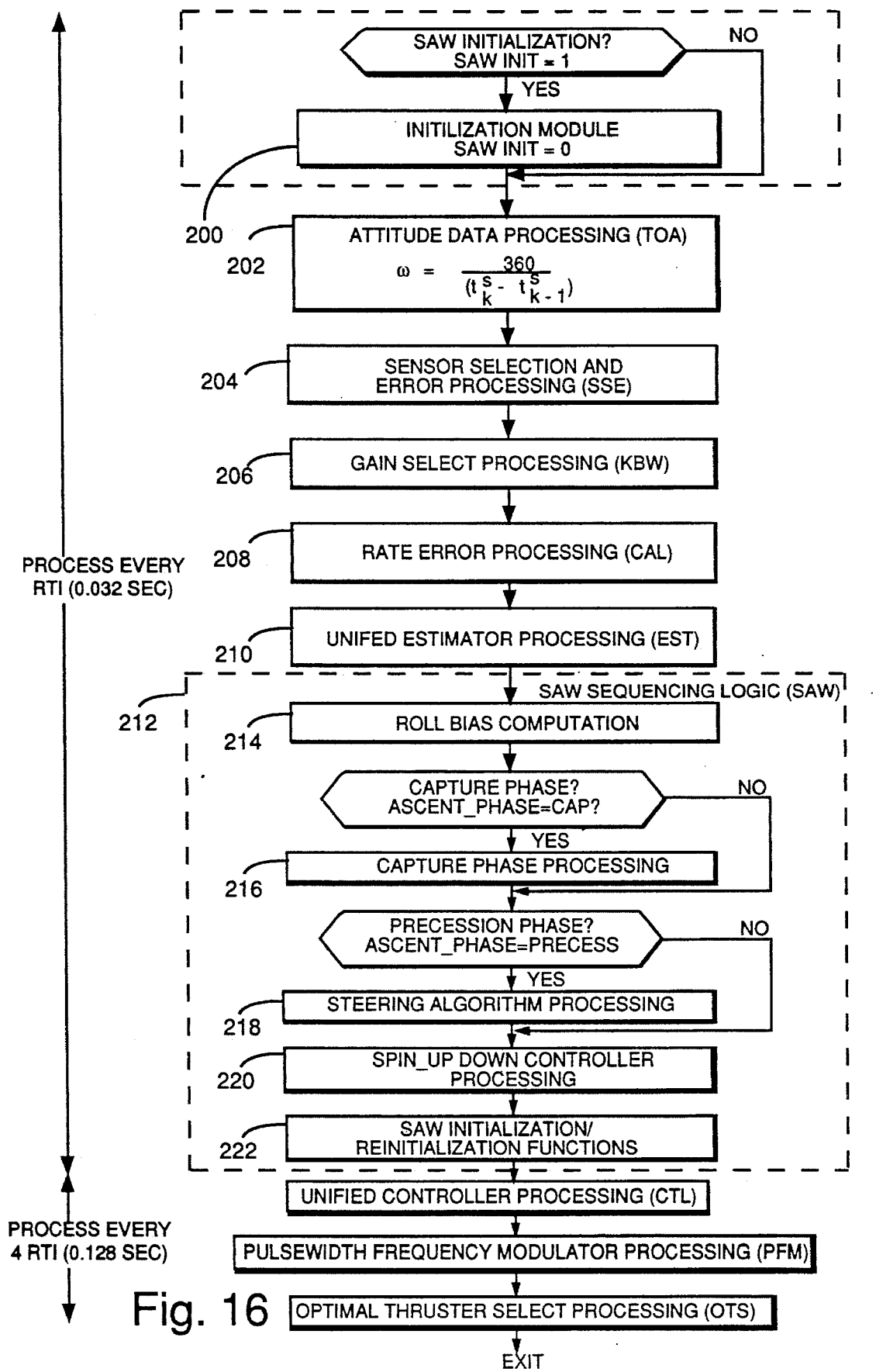
FIG. 16 provides a transfer orbit processing flow diagram for the SAW controller in accordance with the present invention.

Referring to FIG. 16, the transfer orbit processing flow diagram, known as ascent mode processing, will now be explained. The SAW sequencing logic and SAW initialization module shown shaded in FIG. 16, is the only transfer orbit unique processing, designed to initialize the unified estimator/controller during all transfer orbit phases.

The ascent mode processing is activated when the Ascent_Mode is commanded. The ascent mode processing is executed at every RTI. The processing is comprised of the sequential execution of a number of computer software units (CSU) as shown in FIG. 16. The processing starts with the initialization module 200, controlled by soft discrete SAW-INIT parameter. It autonomously initializes the estimator/controller parameters when the ascent mode is commanded.

Figure 17:
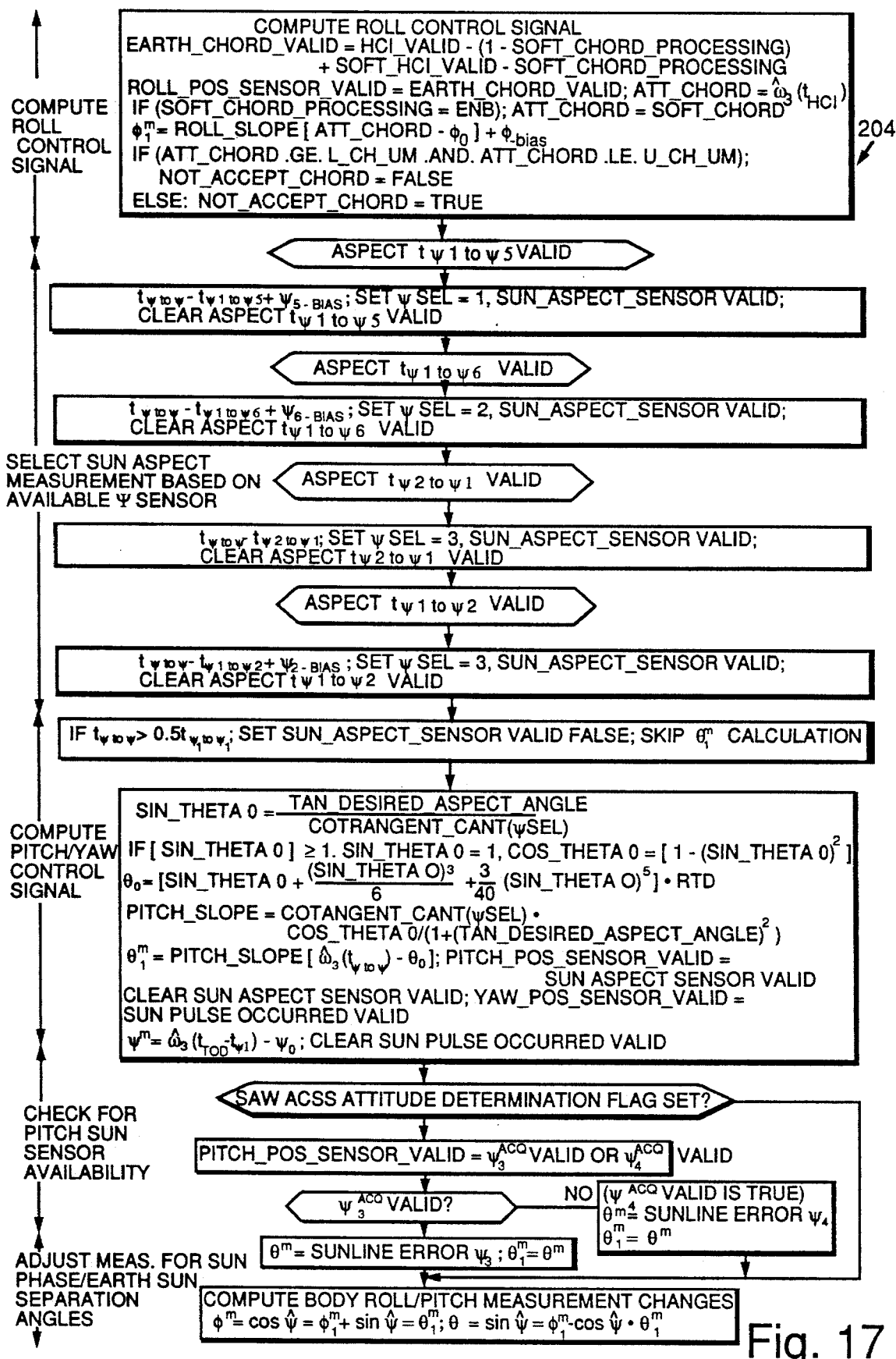
FIG. 17 provides a flow diagram of the sensor selection and error processing employed in the ascent mode.
Figure 18:
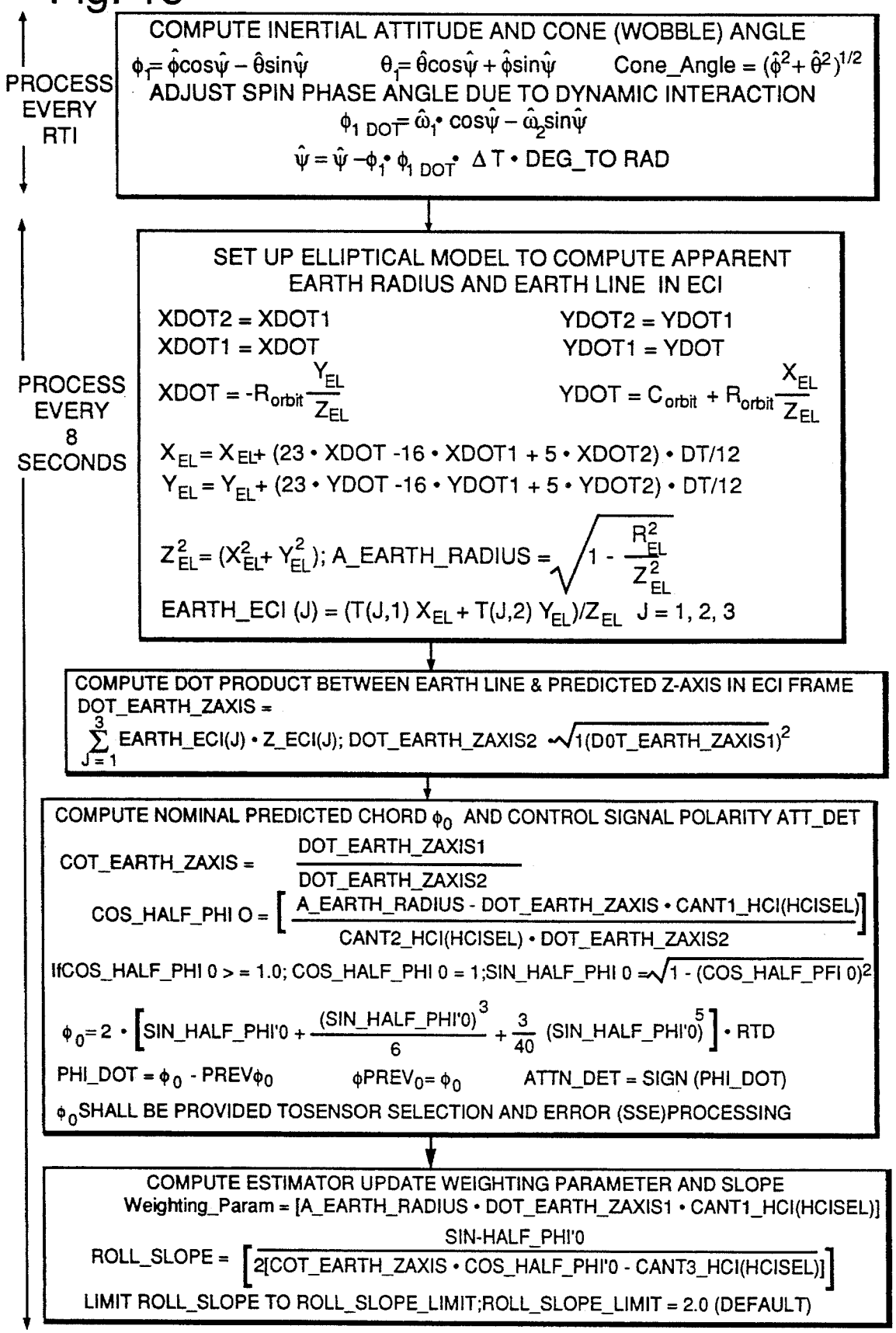
FIG. 18 provides a flow diagram of the roll bias computation employed by the SAW controller.

The transfer orbit attitude data processing (TOA) 202 is performed to process HCI chord data, spin speed and aspect angle measurements. These processings are used for ground (or on-board) attitude determination. The sensor selection and error processing (SSE) unit 204 generates proper roll/pitch/yaw control signals from the transfer orbit sensor measurements. The control signals are used in the unified estimator. The SSE unit 204, for example, computes the aspect angle (or chord measurements) from the aspect sensor time (or leading edge/trailing edge time) measurements and then compares these measurements against the predicted aspect (or chord measurement) to determine the control signals. The predicted aspect measurement, computed in SSE unit 204, is based on the cant angle of the selected sun sensor. In addition, the SSE unit 204 also provides the sensor valid status to the gain selection algorithm to indicate valid sensor output. The predicted chord, used in SSE to generate roll control signal, is computed in roll bias section of the SAW sequencing logic described later. The functional processing logic of the SSE unit 204 related to transfer orbit operation, is shown in FIG. 17.

The transfer orbit estimator/controller gains are provided by the gain select processing (KBW) CSU 206 and is captured in Table 3. The rate error processing unit 208 computes the roll/pitch/yaw body rate measurements from gyro outputs after gyro outputs are compensated from known gyro alignments and bias estimates as shown in FIG. 26. The unified estimator processing (EST) unit 210 implements the discrete state estimator equations defined above to estimate the spin axis instantaneous attitude ($\phi$, $\theta$) and its phase ($\hat{\psi}$) from gyro and attitude control signals.

The SAW sequencing logic 212 is comprised of five functional parts. These are: (i) roll bias computation (unit 214) for the predicted earth chord and estimator/controller update gain/phase; (ii) capture phase processing (unit 216); (iii) precession phase processing (unit 218); (iv) spin speed control (spin up/down) processing (unit 220); and (v) SAW initialization/re-initialization/gyro calibration processing (unit 222). Each of the five processing functions will be explained by defining its functional objective and processing criterion. A flow diagram will be provided where it is deemed to be appropriate for clarity and understanding.

The roll bias computation unit 214 generates the expected chord measurement based on desired z-axis orientation in ECI frame. The predicted chord $\phi_o$ computed here is provided to the SSE. In addition, the computed cone/wobble angle and estimator gain (based on chord measurement due to sensitivity and control signal phasing) are computed in this CSU. The polarity (ATT_DET) of the estimator gain as a function of chord output and time varying nature of gain is provided to gain selection CSU. The wobble angle computation is used in the capture phase processing described below to define optimal controller switching to initiate the active control phase.

The capture phase (unit 216) involves two methods of operations via (i) geometric axis (z-axis); and (ii) principal axis capture.

The geometric axis (z-axis) capture phase initializes the estimator roll/pitch body Euler angles $\phi$ and $\theta$, at every spin cycle to the instantaneous cone_angle (wobble plus nutation) in the local inertial frame, as described above. Note the fact that the instantaneous cone_angle is computed by taking the arc tangent (or an approximation of that) of the ratio of the system momentum components $\hat{H}_2/\hat{H}_3$ or $\hat{H}_1/\hat{H}_3$. In order to compute the system momentum components ($\hat{H}_1$, $\hat{H}_2$, $\hat{H}_3$) inertia mass property estimates ($I_{11}$, $I_{12}$, $I_{13}$, $I_{23}$, $I_{22}$, $I_{33}$) are used in conjunction with body rate estimates ($\hat{\omega}_1$, $\hat{\omega}_2$, $\hat{\omega}_3$). The roll/pitch body rate estimates $\hat{\omega}_1/\hat{\omega}_2$ are derived directly from the roll/pitch gyro outputs. Since the yaw gyro may not be available due to gyro turn-on constraint, the yaw body rate estimate $\hat{\omega}_3$ is obtained from the inertial yaw rate measurement, $\omega_3^s$ (obtained from $\psi_1$ time of arrival) and computed cone_angle i.e.

$$\hat{\omega}_3 = \omega_3^s \bullet \cos(\text{cone\_angle})$$

The once per spin cycle initialization of the state estimator is accomplished when the estimated spin phase angle (based upon $\psi_1$ sun sensor output) is within the desired capture spin reference angle $\psi_{CAP}$ by an amount equal to ($\hat{\omega}_3 \Delta T/\text{DIV\_PREC}$). The magnitude of the capture window width is half of the expected capture phase angle change over one RTI ($\Delta T$=32 msec). DIV_PREC is a divisor and is nominally equal to 2. The width of the capture window at nominal capture spin speed $\omega_3^s$= 24°/sec) is approximately equal to 0.31°. By limiting the absolute value of the deviation ($|\hat{\psi}-\psi_{CAP}|$) of the spin phase angle from the desired capture phase angle $\psi_{CAP}$ to be less or equal to the window width, the initialization at every spin period is assured.

The capture phase window bias of $\psi_{CAP}$ is nominally set to zero. However, the capture phase angle $\psi_{CAP}$ can be chosen to optimize the system performance even further. For example $\psi_{CAP}$ can be set as follows (depending on the presence of nutation or wobble):

$$\psi_{CAP} = -\tan^{-1}\frac{\hat{\alpha}_2^d}{\hat{\alpha}_1^d} \quad : \text{No nutation present};$$

$$= -45° \text{ sign } (\hat{\omega}_1 \cdot \hat{\omega}_2): \text{With nutation}$$

where $\hat{\alpha}_2^d/\hat{\alpha}_1^d$, $\hat{\omega}_2/\hat{\omega}_1$ are the acceleration and rate estimates of the pitch/roll axis. The rationale for skewing the capture window is to allow optimal sampling of the cone_angle. However, the system performance is more than adequate without $\psi_{CAP}$ being set to a non-zero number. It should also be remembered that $\psi_{CAP}$ can be used to offset the capture window if the $\psi_1$ sun sensor noise becomes an issue. Note the fact that $\psi_1$ sun sensor phase angle information is used to update estimated phase angle $\hat{\psi}$.

Thus, the estimated roll/pitch attitudes $\phi$ and $\theta$, will measure the instantaneous Euler error angles (in body frame) of the z-axis from the initial momentum vector orientation. Since the controller is a null-seeking type, the z-axis is configured to the original momentum vector orientation when the control actuation nulls $\phi$ and $\theta$ i.e. ($\phi$=0; $\theta$=0). Thus, the functional logic diagram of capture phase operation shown in FIG. 19 performs the following:

Capture phase initializes the estimator angles (roll/pitch) at every spin cycle to the instantaneous roll/pitch "wobble" angles in the local inertial plane as described above. This initialization process defines the z-axis orientation with respect to initial momentum vector. The estimator propagates body attitudes with this initial condition for the rest of the spin cycle.

If both RCS thruster and OTS are enabled, control for capture is initiated when the estimated cone_angle is minimum where the cone_angle is defined as:

$$\text{cone\_angle} = \sqrt{\hat{\phi}^2 + \hat{\theta}^2}$$

The cone_angle is going to change if there is nutation. Current, cone_angle is compared against previous cone_angle to initiate optimal switching for control actuation.

Capture_phase control is completed in 60 seconds and control returns to coast_phase autonomously.

Figure 19:
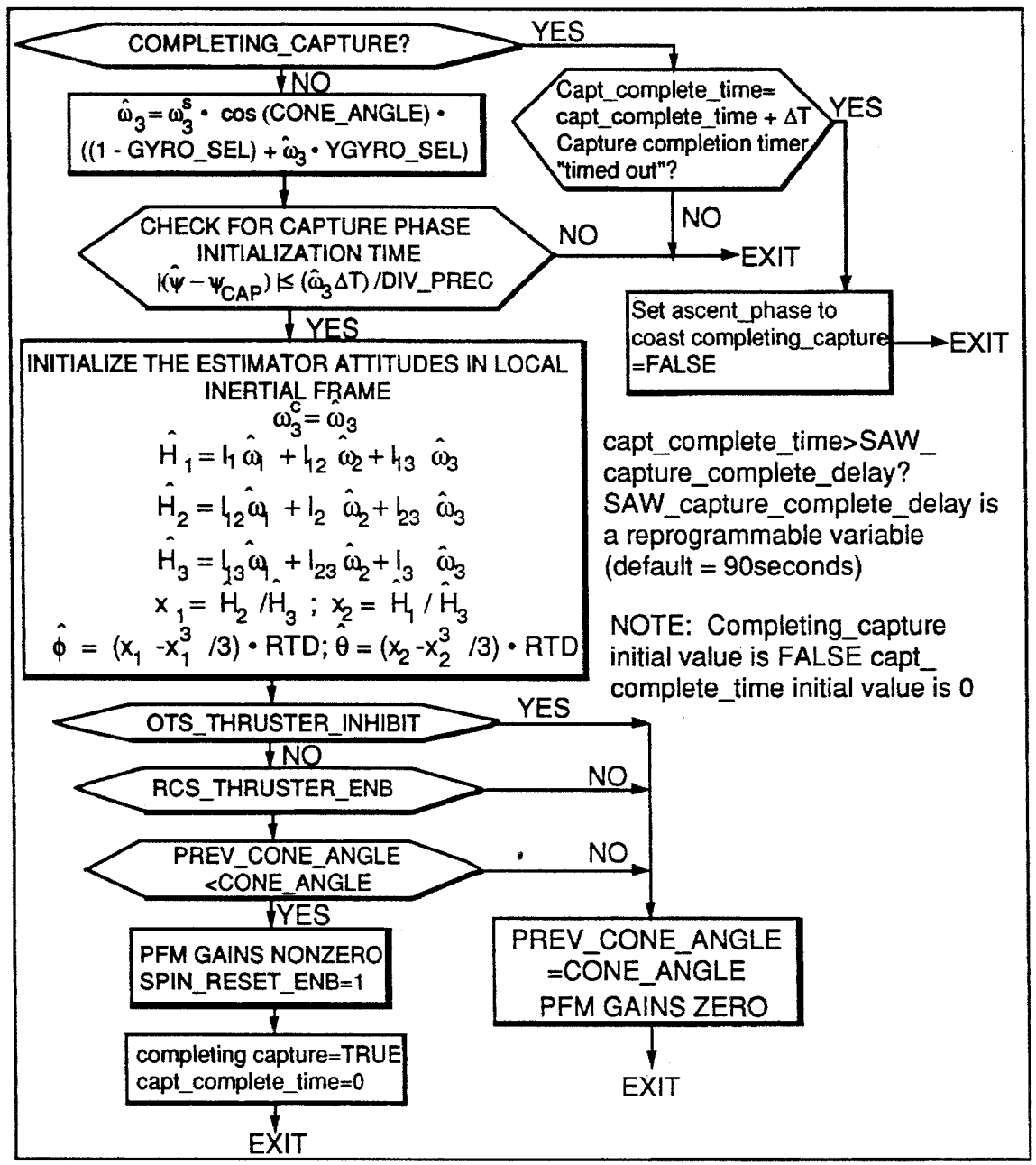
FIG. 19 provides a flow diagram of the spin axis attitude computation used during the capture phase of the transfer orbit.

As seen in FIG. 19, the capture phase processing (unit 216) is initiated, once every spin period, when the estimated spin phase $\hat{\psi}$ is within an angle of $\hat{\omega}_3\Delta T$ of the commanded capture phase angle $\psi_{CAP}$. If it is true, then inertial yaw rate $\omega_3{}^s$ based on sun sensor is adjusted to compute the yaw body rate $\hat{\omega}_3$. This is done due to the fact that yaw gyro may not be available for all capture phase operations.

The momentum vector components $\hat{H}_1$, $\hat{H}_2$, and $\hat{H}_3$, computed based on roll, pitch and yaw body rates, are used to initialize the estimated attitudes. Note that the arc tangent of the ratio of the momentum components are approximated by two terms of the power series expansion.

The next series of checks assure that the thrusters are enabled at the optimal instant, provided both OTS and RCS thrusters are enabled. The optimal cone_angle is computed by comparing the current cone_angle against the previous cone_angle. When the cone_angle slope becomes positive, the control is turned on to initiate the active control process. The active control processing is performed for 60 seconds before the control is returned to coast phase.

The principal axis capture operation is identical to the z-axis capture except the transverse body rates and wobble angles are commanded to non-zero values. The principal axis capture is utilized to remove nutation without capturing $$\dot{\omega}_2 = -\omega_3\omega_1 + a_2{}^c; \quad \theta = -\omega_3\phi + \omega_2$$

$$c_1^{\omega_2} = \frac{I_3 - I_2 + I_1}{I_1} \omega_3$$

$$c_2^{\omega_1} = -\frac{I_3 - I_1 + I_2}{I_2} \omega_3$$

Figure 20:
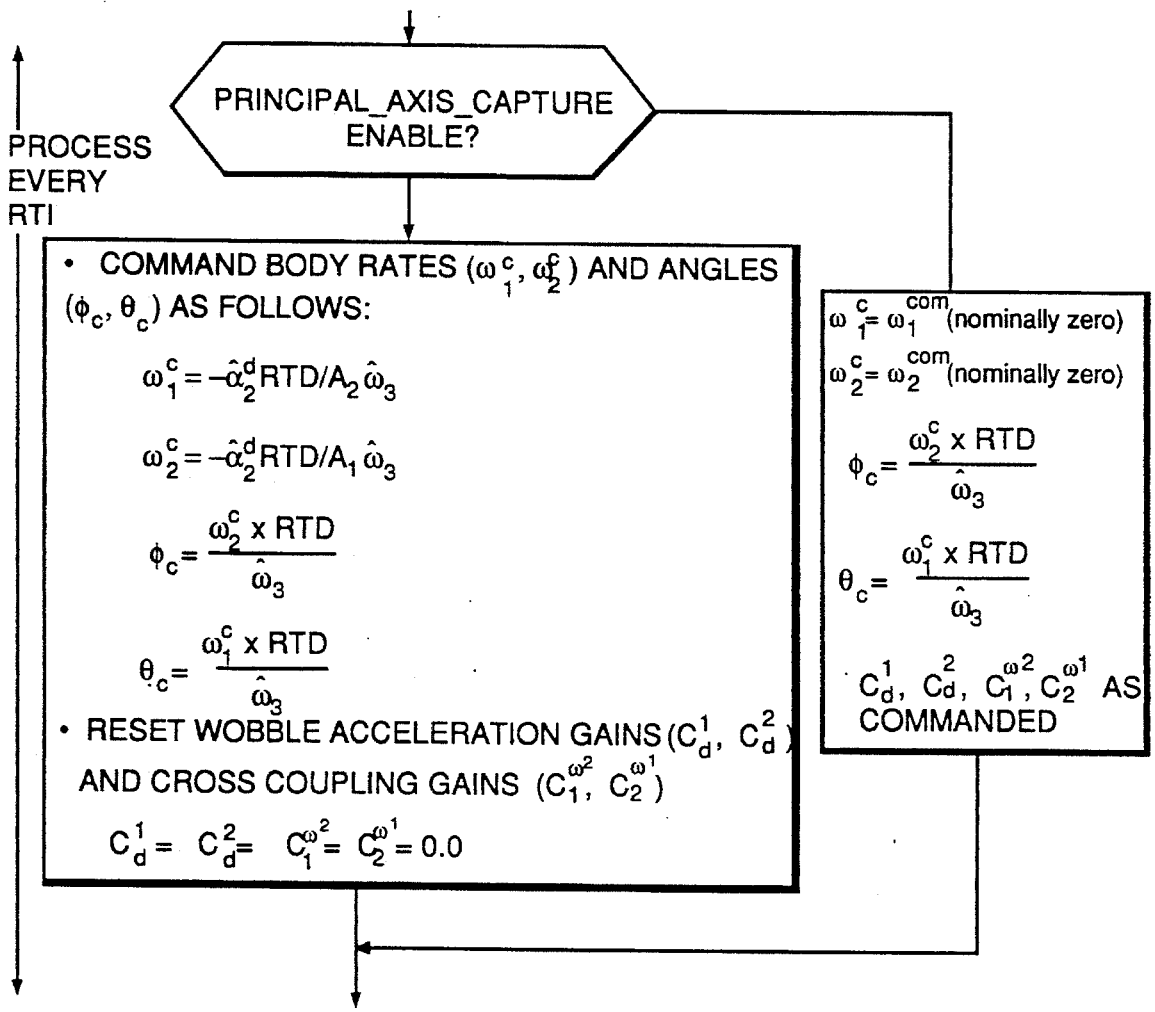
FIG. 20 provides a diagram of the flow logic used for the principal axis capture.

Since the inertial rates $\omega_1{}^I/\omega_2{}^I$ and body rates are related by the rotational matrix as $$\begin{bmatrix} \omega_1{}^I \\ \omega_2{}^I \end{bmatrix} = \begin{bmatrix} C\omega_s t & -S\omega_s t \\ S\omega_s t & C\omega_s t \end{bmatrix} \begin{bmatrix} \omega_1 \\ \omega_2 \end{bmatrix}; \quad (19.3)$$

it can be seen (assuming spin speed $\omega_3$=constant) that $$\frac{d}{dt}\begin{bmatrix} \omega_1{}^I \\ \omega_2{}^I \end{bmatrix} = \omega_3 \begin{bmatrix} 0 & -1 \\ 1 & 0 \end{bmatrix}\begin{bmatrix} \omega_1{}^I \\ \omega_2{}^I \end{bmatrix}\begin{bmatrix} C\omega_s t & -S\omega_s t \\ S\omega_s t & C\omega_s t \end{bmatrix}\begin{bmatrix} 0 & \omega_3 \\ -\omega_3 & 0 \end{bmatrix}\begin{bmatrix} C\omega_s t & S\omega_s t \\ -S\omega_s t & C\omega_s t \end{bmatrix}\begin{bmatrix} \omega_1{}^I \\ \omega_2{}^I \end{bmatrix} + \begin{bmatrix} C\omega_s t & -S\omega_s t \\ S\omega_s t & C\omega_s t \end{bmatrix}\begin{bmatrix} a_1{}^c \\ a_2{}^c \end{bmatrix}$$

i.e. $\begin{bmatrix} \dot{\omega}_1{}^I \\ \dot{\omega}_2{}^I \end{bmatrix} = \begin{bmatrix} C\omega_s t & -S\omega_s t \\ S\omega_s t & C\omega_s t \end{bmatrix}\begin{bmatrix} a_1{}^c \\ a_2{}^c \end{bmatrix}$ z-axis. This reduces significant fuel consumption during active coast phase. The simple logic for the principal axis capture is shown in FIG. 20.

To understand the precession maneuver, the fundamental rigid body dynamic/kinematic equations are shown below:

$$\dot{\omega}_1 = -\frac{(I_3 - I_2)}{I_1}\omega_3\omega_2 + \alpha_1{}^d - \hat{\alpha}_1{}^d + c_1{}^{\omega_2}\omega_2 + a_1{}^c \quad (19.1)$$

$$\dot{\omega}_2 = \frac{(I_3 - I_1)}{I_2}\omega_3\omega_1 + \alpha_2{}^d - \hat{\alpha}_2{}^d + c_2{}^{\omega_1}\omega_1 = a_2{}^c$$

$$\dot{\phi} = \omega_3\theta + \omega_1 \qquad a_1{}^c = -K_p\phi - K_R\dot{\omega}$$

$$\dot{\theta} = -\omega_3\phi + \omega_2 \qquad a_2{}^c = -K_p\theta - K_R\dot{\omega}$$

where $\omega_1/\omega_1$ and $\phi/\theta$ are roll/pitch body rates and attitudes, $\alpha_1{}^d$, $\alpha_2{}^d$ are true accelerations, $\hat{\alpha}_1{}^d$, $\hat{\alpha}_2{}^d$ are their estimates, $a_1{}^c$, $a_2{}^2$ are dc control accelerations, $c_1{}^{\omega_2}$, $c_2{}^{\omega_2}$ are the cross-coupling gains. Nominally, the true accelerations $\alpha_1{}^d$ and $\alpha_2{}^d$ would be estimated by $\hat{\alpha}_1{}^d$ and $\hat{\alpha}_2{}^d$. Thus they would cancel out $K_p$ and $K_R$ are the direct gains to control the primary axis (roll or pitch).

There are two primary ways of selecting the cross-coupling gain: (i) precession with inertial decoupling of control acceleration and nutation (ii) precession with decoupling in the body.

Approach 1: Inertial Decoupling

The cross couple gains $c_1{}^{\omega_2}/c_2{}^{\omega_1}$ can be chosen such that the rigid body equations (19.1) is reduced to the following:

$$\dot{\omega}_1 = \omega_3\omega_2 + a_1{}^c; \quad \dot{\phi} = \omega_3\theta + \omega_1 \quad (19.2)$$

Since the control accelerations $a_1{}^c$ and $a_2{}^c$ are linear feedback of body rates and attitude, it can be seen that $$\begin{bmatrix} \dot{\omega}_1{}^I \\ \dot{\omega}_2{}^I \end{bmatrix} = -\begin{bmatrix} C\omega_s t & -S\omega_s t \\ S\omega_s t & C\omega_s t \end{bmatrix}\begin{bmatrix} K_R\omega_1 + K_p\phi \\ K_R\omega_2 + K_p\theta \end{bmatrix} \quad (19.5)$$

$$= -K_R\begin{bmatrix} C\omega_s t & -S\omega_s t \\ S\omega_s t & C\omega_s t \end{bmatrix}\begin{bmatrix} \omega_2 \\ \omega_1 \end{bmatrix} - K_p\begin{bmatrix} C\omega_s t & -S\omega_s t \\ S\omega_s t & C\omega_s t \end{bmatrix}\begin{bmatrix} \phi \\ \theta \end{bmatrix}$$

$$= -K_R\begin{bmatrix} \omega_1{}^I \\ \omega_2{}^I \end{bmatrix} - K_p\begin{bmatrix} \phi_I \\ \theta_I \end{bmatrix}, \text{ assuming perfect estimation}$$

Note that $\phi_I$ and $\theta_I$ are inertial attitudes defined with the rotational matrix. Equation (19.5) shows that the inertial acceleration is decoupled. Thus, there is no cross-coupling between inertial roll and pitch. Therefore, an inertial precession will not involve any cross axis error.

Approach 2: Decoupling in the Body

In this approach, the cross couple gains $c_1{}^{\omega_2}$, $c_2{}^{\omega_1}$ are chosen in such a way that the steady state equation under precession results as follows:

$$\dot{\omega}_1 = -\omega_3\omega_2 + a_1{}^c$$

$$\dot{\omega}_2 = \omega_3\omega_1 + a_2{}^c \quad (19.6)$$

$$\dot{\Phi} = \omega_3\theta + \omega_1$$

$$\dot{\theta} = -\omega_3\Phi + \omega_2$$

Thus the resulting cross-coupling gains are given as $$c_1^{\omega_2} = \frac{(I_3 - I_1 - I_2)}{I_1} \omega_3; \qquad (19.7)$$

$$c_2^{\omega_1} = -\frac{(I_3 - I_1 - I_2)}{I_2} \omega_3$$

The rationale for selecting the cross-coupling gain, $C_R$, in such a way that the dynamic/kinematic equation results into set (19.6) is so the precession can be performed with no dynamic coupling in the body. This can be seen by taking laplace transform of (19.6) as $$\begin{bmatrix} \omega_1(S) \\ \omega_2(S) \end{bmatrix} = \frac{1}{S^2 + \omega_s^2} \left\{ \begin{bmatrix} s & -\omega_3 \\ \omega_3 & S \end{bmatrix} \begin{bmatrix} \omega_1(0) \\ \omega_2(0) \end{bmatrix} + \begin{bmatrix} S & -\omega_3 \\ \omega_3 & S \end{bmatrix} \begin{bmatrix} a_1^c \\ a_2^c \end{bmatrix} \right\} \qquad (19.8)$$

$$\begin{bmatrix} \phi(S) \\ \theta(S) \end{bmatrix} = \frac{1}{S^2 + \omega_3^2} \left\{ \begin{bmatrix} S & \omega_3 \\ -\omega_3 & S \end{bmatrix} \begin{bmatrix} \phi(0) \\ \theta(0) \end{bmatrix} + \frac{1}{S^2 + \omega_3^2} \begin{bmatrix} S & \omega_3 \\ -\omega_3 & S \end{bmatrix} \begin{bmatrix} \omega_1(S) \\ \omega_2(S) \end{bmatrix} \right\} \qquad (19.9)$$

Substitution of (19.8) into (19.9) results in

Thus, it can be seen from equation (19.10) that choosing $C_R$ as shown in (19.7) effectively decouples the roll/pitch body motion. The steady state with time response ($a_1^c = a_2^c = 0$) of (19.10) is given by $$\phi(t) = \phi(0)\cos\omega_3 t + \theta(0)\sin\omega_3 t + \frac{t\omega_1(0)}{\omega_3} \qquad (19.11)$$

$$\theta(t) = -\phi(0)\sin\omega_3 t + \theta(0)\cos\omega_3 t + \frac{t\omega_2(0)}{\omega_3}$$

As shown before, the inertial attitude and body attitude are related as $$\begin{bmatrix} \phi_I \\ \theta_I \end{bmatrix} = \begin{bmatrix} C\omega_s t & -S\omega_s t \\ S\omega_s t & C\omega_s t \end{bmatrix} \begin{bmatrix} \phi \\ \theta \end{bmatrix} = \begin{bmatrix} \phi(0) \\ \theta(0) \end{bmatrix} + \qquad (19.12)$$

$$\frac{t}{\omega_3} \begin{bmatrix} \omega_1(0)\cos\omega_3 t + \omega_2(0)\sin\omega_3 t \\ -\omega_1(0)\sin\omega_3 t + \omega_2(0)\cos\omega_3 t \end{bmatrix}$$

Implementation of cross-coupling gains defined in either (19.2) or (19.7) will result in an accurate inertial precession if an initial body attitude angle (e.g. $\theta(0)=10°$) is commanded. Since equations (19.5) and (19.10) demonstrate perfect decoupling, there is no cross-coupling between roll and pitch axis. Thus, a pitch body rotation of 10 degrees ($\theta(0)=10°$), for example, at a target phase angle of 90° will produce an inertial z-axis precession of 10° about the "−" (or negative) roll inertial axis. The most important fact is that the nutation and cross-axis torque transmission are ideally reduced to zero.

Operationally, the primary function of the precession logic (unit 218) is to precess the z-axis to a predetermined inertial location. This is done by performing an incremental rotation about the body pitch axis at a particular spin phase angle, known as target phase angle. The magnitude of the precession is specified by an initial condition on pitch estimated attitude. The functions performed during this phase, shown in FIG. 21, can be explained as follows:

Estimator computes spin_phase angle estimate $\hat{\psi}$ by integrating gyro output. The spin_phase is adjusted with $\psi_1$ sun sensor output before the initiation of the precession maneuver.

On-board attitude updates with HCl and/or aspect sensors are disabled before the start of precession Ground provides four key parameters via: total precession angle $\theta_{PREC}$ to be executed about body pitch axis at a specific target phase angle $\psi_{TARGET}$, incremental precession step size $\theta_{INCR}$, time interval ($T_{PRECESS}$) between successive precessional steps Precession is initiated when $|\hat{\psi} - \psi_{TARGET}| \leq (\omega_s \Delta T)/DIV\_PRECESS$; $\omega_s$=spin speed;

$\Delta T = .032768$ sec; DIV_PRECESS=2

Note that the above condition will be nominally satisfied once every spin period. It is also to be noted that the precession criterion defined above, involves a built-in reliability check which nullifies precession if the criterion is not satisfied due to a sudden yaw rate change (e.g. gyro failure, thruster failure, etc.)

Estimator roll/pitch angles are initialized, for one RTI cycle, when an incremental precession is initiated according to the following algorithm $\theta = -\theta_{PRECESS} + \theta$ $\phi = -\theta_{PRECESS} (\hat{\psi} - \psi_{TARGET}) \bullet DEG\_TO\_RAD + \phi + PREC\_FOLLOW\_GAIN \bullet \theta_{INCR}$ $\psi_{TARGET} = \psi_{TARGET} + 180 \bullet DOUBLE\_PRECESS$ WRAP $\psi_{TARGET}$ to $-180°$ to $180°$ IF DOUBLE_PRECESS=$\theta_{PRECESS}$—$\theta_{PRECESS} \bullet (2 \bullet DOUBLE\_PRECESS-1$_

This is shown in FIG. 22a.

Adding precessional step $\theta_{PREC}$ to the current estimator output $\theta$ minimizes accumulation of attitude error if an incremental precessional step is commanded before the spacecraft completely settles out. The same statement is also true for the roll attitude estimate $\phi$. In addition, the roll attitude estimate $\phi$ is adjusted to minimize the cross axis error due to the fact that the precession is not likely to happen exactly at the target phase angle $\psi_{TARGET}$. Nominally, this adjustment is small. However, if the precession window $|\hat{\psi} - \psi_{TARGET}|$ is opened up by reducing DIV_PRECESS to allow for out-of-spec performance of thruster or error due to gyros in high rate range mode, the adjustment becomes significant. The last compensation term is supposed to minimize the effect of finite cross axis disturbance transmission. This disturbance transmission is proportional to the incremental step size $\theta_{INCR}$. The nominal gain (PREC_FOLLOW_GAIN) is set to 0.005.

The steering algorithm (unit 218) also provides capability to perform incremental precession in alternating fashion (as shown in FIG. 22b) by adjusting the target phase angle. Note the fact that precessing z-axis by a pitch rotation $\theta_{PREC}$ at target phase angle $\psi_{TARGET}$ is equivalent to a precession angle of $-\theta_{PREC}$ at a target phase angle of $\psi_{TARGET}+180°$. The rationale for doing this alternating precession is the fact that it bounds the amplification (or excitation) of propellant motion by allowing to precess at smaller step without requiring excessive precession time. In addition, forced modal excitations are of cancelling nature.

If desired precess angle exceeds 5°, precession should be performed incrementally with 5° steps at the same spin target phase angle. When precession is completed, control returns to coast phase after 60 seconds following the execution of the last incremental precession step.

Precession may also be done, if desired, as a series of commanded maneuvers (less than 10 degrees each), which allows adjustment of the target phase angle using nominal stored command capability.

The primary functions performed in the coast phase are defined as follows:

Capture/precession/LAM operational phases terminate into coast phase, Z-axis or principal axis capture is terminated into coast phase autonomously after 90 seconds. Ninety seconds after completion of precession or LAM maneuver, the active phase operation is preferably terminated with coast phase.

Yaw spin axis control during extended coast phase operation is based on "rate control only" in a low bandwidth ($G_R$_Yaw=0.002) configuration to minimize north thruster actuation. Roll and pitch controller bandwidth gain $G_R$ is reduced to 0.01.

Gyro_cal, if required, is performed during the coast phase with high bandwidth yaw_gain ($G_R$_Yaw= 0.5).

On-board attitude determination and correction is performed during coast phase

Spin_up and spin_down is initiated from coast phase

For active extended coast orbit operation, the spacecraft can be configured to spin about the principal axis with or without active control. With active control, the controller gains and attitude/rate commands are adjusted by invoking principal_axis capture to realize the fuel-optimized configuration.

The principal_axis capture, in conjunction with coast phase operation, configures SAW controller in the most fuel-optimized condition by commanding the spacecraft to spin about principal axis. The cross-coupling rate ($C_1^{\omega_2}$, $C_2^{\omega_1}$) gains and wobble acceleration control gains ($C_{d1}, C_{d2}$) are also set to zero. The resetting of gains are performed by enabling principal_axis_capture command which autonomously transitions to fuel-optimized coast operation after 90 seconds from the initialization of principal_axis capture. For extended fuel-optimized operation, the thruster active nutation damping (TANC) command should be sent after 60 seconds to prepare for transitioning into passive configuration. Principal_axis capture followed by enabling TANC is the recommended configuration for capturing the principal axis as the spacecraft (without changing the momentum vector orientation) to remove the nutation in the most fuel optimized fashion, provided the spin rate >⅓ rpm. If the spin rate is around ⅓ rpm, z-axis capture and coast is very fuel efficient (<2 lb of propellant per day). The time line for nominal coast phase is shown in FIG. 23.

With respect to LAM Phase Operation:

The SAW sequencing logic 212 generates LAM-on and LAM-off status from LAM-duration_window and LAM_thruster_enable states SAW sequencing logic 212 provides this information to gain selection CSU for LAM-phase gain determination to control attitude transients at the entry into and exit from LAM operation. The acceleration gain is set to a high value (=0.1) for five seconds. After 5 seconds, the acceleration gain is set to 0.01 (see FIG. 24A).

As pointed out earlier, SAW controller 12 provides phase lead capability with a notch filter to actively stabilize any undesirable slosh mode. The notch filter parameters are reprogrammable to accommodate slosh frequency shift. In addition, SAW controller 12 provides axis-specific notch filter processing capability. Due to high slosh damping results (4%–6%) realized from representative slosh tests, notch filtering will not nominally be invoked. Phase lead with a notch filter will be activated only if the in-orbit slosh data demonstrates drastically different characteristics from the ground test results.

Gradual axial throttling (shown in FIG. 24B) performed prior to LAM engine being turned on, is assumed. It shall be configured with normal stored commands. The intent for graduated axial throttling is to control the transient propellant motion $\delta_t$. It should be noted that the axial and radial forces (shown in FIG. 25) define the steady state pendulum motion $\delta_t$, as a function of spin speed, when the LAM is turned on. The gradual axial thrusting prior to LAM operation is carried out to limit the transient propellant motion.

The spin-up/despin operation (unit 220) is performed within the SAW sequencing logic 212. The primary purpose of this logic is to (i) eliminate spin-phase angle control (i.e. no position feedback) during spin rate control; and (ii) scale the wobble acceleration as a function of rate.

Sequencing logic provides spin_up/despin capability closed loop despin/spin up capability is needed to turn the yaw gyro on/off to comply with gyro turn on/off constraints (input axis rate should be less than 10°/sec) at gyro turn-off/turn-off Despin/spin up capability thus utilizes elimination of spin_angle control Scaling of roll/pitch acceleration estimates as feedforward inputs to unified estimator Scaling of rate changes $\Delta\omega^t$ (most importantly yaw) from OTS during this phase, when yaw rate sensor output may not be frequently available;

a) because the yaw gyro may not be on or b) sun sensor data is available only once per spin period.

A functional logic diagram of Spin-Up/Despin Operation 220 is shown in FIG. 26.

The roll/pitch gyro calibration is not normally required for SAW operation with nominal gyro bias uncertainties (up to 15°/hour), gyro misalignments/non-orthogonality (up to 0.2°) and gyro scale factor noise. However, yaw gyro calibration is required for spin phase determination during precession when $\psi_1$ sun sensor is not used. Influencing factors for yaw gyro bias calibration are:

gyro misalignments/non-orthogonality residual wobble angle under active control update gains $g_{11}, g_{21}, g_{31}$, even if set to non-zero value, are set to zero if the sensor states are not valid The roll/pitch sun sensor based rate estimates $\hat{\omega}_1^s$ and $\hat{\omega}_2^s$ are derived from SAW initialization/reinitialization submodule The yaw rate $\hat{\omega}_3^s$ based on sun sensor is generated from TOA submodule.

A functional logic diagram of gyro calibration process 224 is shown in FIG. 27. Various gyro calibration gains in the functional flow diagram are captured later in Table 3d.

Figure 28:
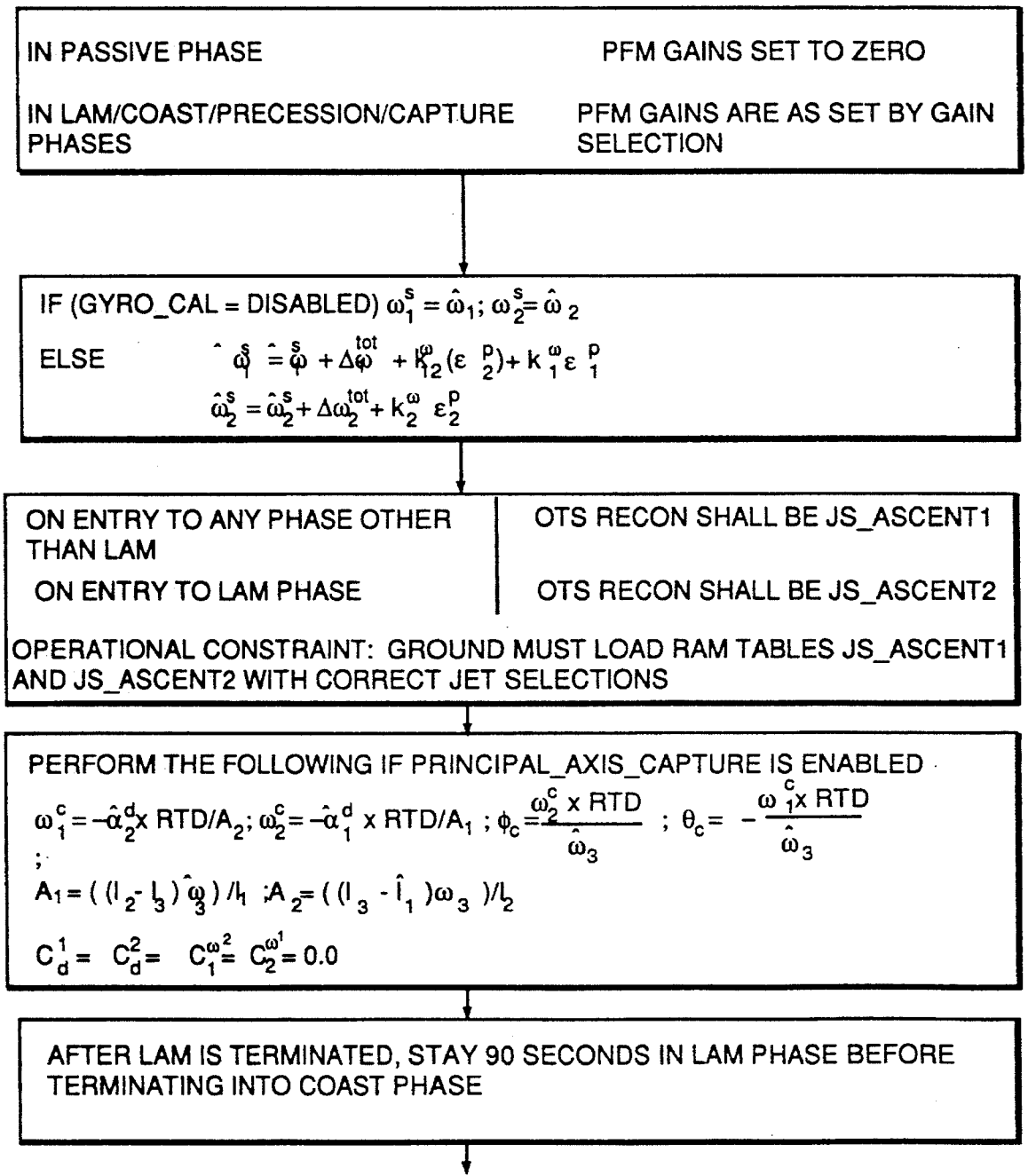
FIG. 28 illustrates the flow of the SAW controller initialization/reinitialization functions.

SAW initialization/reinitialization functions are shown in FIG. 28. This section sets proper gains for pulsewidth frequency modulator as a function of ascent phase. In addition, when gyro calibration is enabled, it sets the roll/pitch gyro calibration variables, generating estimated roll/pitch rates $\omega_1^s$, $\omega_2^s$ based on aspect sun sensor and/or earth sensor. Note the position measurement residuals $\epsilon_1^p$ and $\epsilon_2^p$ are obtained from unified estimator. This section also set autonomous thruster jet selection for OTS as a function of ascent_mode phase.

Figure 29:
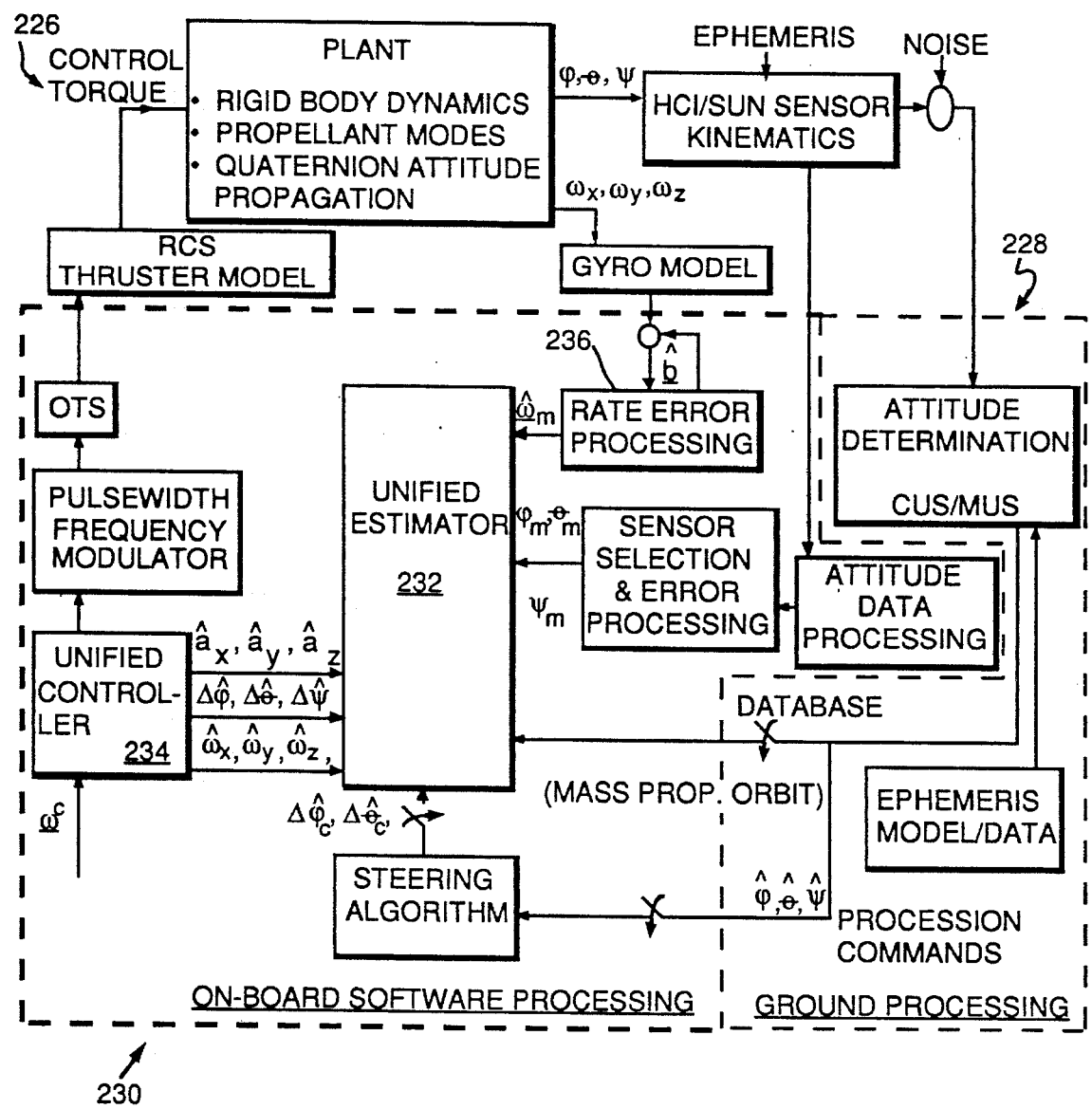
FIG. 29 provides a functional diagram of the SAW control system's validation architecture in accordance with the present invention.

FIG. 29 shows a functional diagram of SAW control systems validation architecture, as implemented in a three-axis nonlinear simulation model. The nonlinear rigid body model 226 also includes a modelling of representative slosh modes. The three-axis attitudes and rates are generated by integrating SDfast-based dynamics and quaternion-based attitudes. The nonlinear simulation program also provides sensor kinematics and gyro dynamics.

The second part of FIG. 29 defines the ground attitude determination processing 228 for the spacecraft 10 using MUS (Mission Unique Software) and CUS capability. The ground attitude determination capability provides another check for validation on-board transfer orbit operations.

The third part of FIG. 29 defines the on-board SAW controller algorithms as implemented on the spacecraft embedded software 230. Although the unified estimator 232, controller 234 and rate error processing unit 236 are shown as part of the SAW controller architecture, these three units may actually be embedded in the corresponding units of FIG. 5. Various phases of transfer orbit operations are supported by SAW sequencing algorithms as shown in the ascent mode processing diagram in FIG. 16.

Table 3a–d; Gain/Parameter Selection for Saw Estimator, Rate Error Processing and Notch Filter TABLE 3a–d Gain/Parameter Selection for Saw Estimator, Rate Error Processing and Notch Filter
Table 3a: Estimator Gains

| Gain/Paramater | Gains for SAW Estimator | |
|---|---|---|
| | C/P | Lam/Coast |
| $k^\phi$ | 0.0 | 0.0\2.5 |
| $k^\theta$ | 0.0 | 0.0\0.5 |
| $k_3^\psi$ | 0.9\0.0 | 0.9\0.9 |
| $k_1^p$ | 0.032768 | 0.032768 |
| $k_2^p$ | 0.032768 | 0.032768 |
| $k_3^p$ | 0.032768 | 0.032768 |
| $k_1^\omega$ | 0.0 | 0.0\.001 |
| $k_{12}^\omega$ | 0.0 | 0.0\0.0 |
| $k_2^\omega$ | 0.0 | 0.0\.0025 |
| $k_{33}^\omega$ | $\omega_{3c}/720$\$\omega_{3c}$\720 | $\omega_{3c}/720$ |
| $k_1^r$ | 0.35 | 0.35 |
| $k_2^r$ | 0.35 | 0.35 |
| $k_3^r$ | 0365 | 0.35 |
| $k_1^\alpha$ | .1*a\o | .1*.01\a |
| $k_2^\alpha$ | .1*a\0 | .1*.01\a |
| $k_3^\alpha$ | 0.0 | 0.0 |
| RGYRO_SEL | 1 | 1 |
| PGRYO_SEL | 1 | 1 |
| YGYRO_SEL | 0\1 | 1 |
| $\Delta T$ | 0.032768 | 0.032768 |
| $K_1^{Lb}$ | $I_1$/RTD | $I_1$/RTD |
| $K_2^{Lb}$ | $I3_1$/RTD | $I_3$/RTD |
| $G_{12}^\pi$ | $\Delta T$ RTD/$I_1$ | $\Delta T$ RTD/$I_1$ |

TABLE 3a–d-continued

Gain/Parameter Selection for Saw Estimator, Rate Error Processing and Notch Filter
Table 3a: Estimator Gains

| Gain/Paramater | Gains for SAW Estimator | |
|---|---|---|
| | C/P | Lam/Coast |
| $G_{22}^\pi$ | $\Delta T$ | $\Delta T$ |
| $G_{32}^\pi$ | $\Delta T$ RTD/$I_3$ | $\Delta T$ RTD/I |

TABLE 3b

Controller Gains

| Gain/Parameter | Gains for SAW Controller |
|---|---|
| $C1^\phi$ | Gr(1-TANC) (RTD(6/I1)) |
| $C1^{\omega 1}$ | Gr(RTD(18 + 2.29$|\omega_3c|$)/I1) |
| $C1^{\omega 2}$ | –(1-cross_axis)DTR($\omega_{3c}$)$I_3$1/I1 |
| $C2^\theta$ | Gr(1-TANC) (RTD(6/I2)) |
| $C2^{\omega 1}$ | (1-cross_axis)DTR($\omega_{3c}$)$I_3$2/I2 |
| $C2^{\omega 2}$ | Gr(RTD(18 + 2.29$|\omega_3c|$)/I2) |
| $C3^\psi$ | $G_{r\_YAW}$(1-TANC) (RTD(6/I3)) |
| $C3^{\omega 3}$ | $G_{r\_YAW}$((RTD(18 + 2.29$|\omega_3c|$)/I3) |
| Cd1 | RTD/I1 |
| Cd2 | 1 |
| Cd3 | RTD/I3 |
| Tm | 4 |
| Tm | 4 |
| $G1^{pwd}$ | 1 |
| $G2^{pwd}$ | 1 |
| $G3^{pwd}$ | 1 |

TABLE 3c

Notch Filter Parameters

| | Quad Filter Gains for SAW Controller | | |
|---|---|---|---|
| GAINS | ROLL | PITCH | YAW |
| A_FILTER_GAIN | 0.128 | 0.128 | 0.0 |
| B_FILTER_GAIN | –0.31 | –0.31 | 0.0 |
| C_FILTER_GAIN | –0.4508 | –0.4508 | 0.0 |
| D_FILTER_GAIN | –0.9696 | –0.9696 | 1.0 |
| F_FILTER_GAIN | 0.4650 | 0.4650 | 0.0 |
| P_FILTER_GAIN | 1.0 | 1.0 | 0.0 |
| Q_FILTER_GAIN | 1.0 | 1.0 | 0.0 |
| R/P/Y AXIS FLAG | 0 | 0 | 0 |

TABLE 3d

Gyro Calib Gains

| Gain/Parameter | Gains for Gyro Bias Processing |
|---|---|
| $k_b^1$ | .007 |
| $k_b^2$ | .007 |
| $k_b^3$ | .0004 |
| $g_{11}$ | 0.0 |
| $g_{21}$ | 0.0 |
| $g_{31}$ | 0.0 |
| $g_{12}$ | 0.0 |
| $g_{22}$ | 0.0 |
| $g_{32}^r$ | .000026 |
| $g_{32}^o$ | .0008 |
| $\Omega$ | .0001 |

TABLE 3d-continued

Gyro Calib Gains

| Gain/<br>Parameter | Gains for Gyro<br>Bias Processing |
|---|---|

Cross_axis = 1 (Coast/LAM); 0 (Precession/Cap)?
Or = 0.5 (Precession/Cap/Coast); 1.0 (LAM)
$G_{r\_YAW}$ = 0.002 (Coast)
$G_{r\_YAW}$ = 0.5 (Precession/Cap/LAM)
$a = C_1 (\omega_3 c)^2 + C_2 |\omega_3 c|$; $\omega_3 c \leq 24$
= .01; $\omega_3 c > 24$
$C_1$ = −2.6515e-05 (reprogrammable)
$C_2$ = 0.001053 (reprogrammable)
$I_3^1 = (I_3 + I_1 - I_2); I_3^2 = (I_3 - I_1 + I_2)$
If $C_i \omega_i > 4.1$; $C_i \omega_i = 4.1$; i = 1, 2, 3

While the above detailed description sets forth the preferred embodiments of the present invention, it will be understood that the present invention is susceptible to modification, variation and change without departing from the scope and fair meaning of the subjoined claims.

What is claimed is:

1. An on-board method of autonomously determining and controlling the attitude of a spacecraft after separation from a launch vehicle, comprising the steps of:

determining the spin axis orientation of said spacecraft relative to a first planetary reference;

determining the three-axis attitude of said spacecraft once a second planetary reference is in view;

bias calibrating at least one of a set of three-axis gyros;

repeatedly integrating the outputs from said gyros in a state estimator model of said spacecraft for continously updating an estimate of the three-axis attitude of the spacecraft, body rate of said spacecraft, rate and acceleration states of said spacecraft; and generating at least one command signal for controlling a thruster motor from a linear combination of said estimated attitude, rate and acceleration states of said spacecraft.

2. The method according to claim 1, wherein said first plantary reference is the Sun and said second planetary reference is the Earth.

3. The method according to claim 1, wherein said set of three-axis gyros includes a yaw gyro, a pitch gyro and a roll gyro.

4. The method according to claim 1, wherein said bias calibration step is performed by correlation with at least one spinning plantary sensor.

5. The method according to claim 1, wherein said spacecraft is unbalanced.

6. The method according to claim 1, including the step of despining said spacecraft to a rate below 5 rpm once the three-axis attitude of said spacecraft is initially determined.

7. The method according to claim 1, wherein said command signal modulates the on-time of said thruster motor using a pulse-width frequency variation of said command signal.

8. An on-board method of autonomously determining and controlling the attitude of an unbalanced spacecraft during its transfer orbit, comprising the steps of:

stabilizing said spacecraft after separation from a launch vehicle;

determining the spin axis orientation of said spacecraft relative to a first planetary reference;

determining the three-axis attitude of said spacecraft once a second planetary reference is in view;

bias calibrating a set of three-axis gyros;

repeatedly integrating the outputs from said bias calibrated gyros in a state estimator model of said spacecraft for continously updating an estimate of the three-axis attitude of the spacecraft, body rate of said spacecraft, and acceleration states of said spacecraft during each phase of said transfer orbit; and generating at least one command signal for controlling a thruster motor from a linear combination of said estimated attitude, rate and acceleration states of said spacecraft.

9. The method according to claim 8, wherein the phases of said transfer orbit include principal axis capture, precession, at least one perigee augmentation maneuver, and at least one apogee augmenation maneuver.

10. The method according to claim 9, wherein the integration of a predetermined one of said three-axis gyros is used to determine the spin phase angle during said precession phase.

11. In a spacecraft having at least one planetary sensor, at least one horizon crossing indicator and a set of three-axis gyros, an on-board three-axes attitude determination and control system, comprising:

means for initially determining the spin axis of said spacecraft from said planetary sensor relative to a first planetary reference;

means for determining the three-axis attitude of said spacecraft for said horizon crossing indicator when a second plantery reference comes into view;

means for bias calibrating at least one of said three-axis gyros;

means for repeatedly determining the current attitude of said spacecraft by integrating said bias calibrated gyro outputs in a state estimator model wherein estimated attitude states of the spacecraft, body rate states of said spacecraft, and acceleration states of said spacecraft are linearly combined to generate at least one thruster command signal; and means for actuating at least one thruster to control said attitude of said spacecraft in response to said determination of the current attitude.

12. The invention according to claim 11, further including means for preventing thruster firings in response to fuel sloshing motion.

13. The invention according to claim 11, wherein said first planetary reference is the Sun, said second planetary reference is the Earth, and said set of three-axis gyros includes a yaw gyro, a pitch gyro and a roll gyro.

14. The invention according to claim 13, wherein said means for bias calibrating correlates each of said three-axis gyros with at least one spinning planetary sensor.

* * * * *